United States Patent [19]
Kishi et al.

[11] Patent Number: 5,453,409
[45] Date of Patent: Sep. 26, 1995

[54] CERAMIC CAPACITOR AND METHOD FOR FABRICATING THE SAME

[75] Inventors: Hiroshi Kishi; Hisamitsu Shizuno; Shinya Kusumi; Hiroshi Saito, all of Tokyo, Japan

[73] Assignee: Taiyo Yuden Co., Ltd., Tokyo, Japan

[21] Appl. No.: 894,471

[22] Filed: Jun. 5, 1992

[30] Foreign Application Priority Data

Jun. 5, 1991 [JP] Japan .................. 3-161033
Jun. 5, 1991 [JP] Japan .................. 3-161034
Jun. 5, 1991 [JP] Japan .................. 3-161035

[51] Int. Cl.$^6$ .......................... C04B 35/46; C04B 35/49
[52] U.S. Cl. ........................ 501/139; 501/138; 501/152; 361/321.1
[58] Field of Search .................... 501/138, 139, 501/152; 361/321

[56] References Cited

U.S. PATENT DOCUMENTS

| | | | |
|---|---|---|---|
| 4,610,969 | 9/1986 | Wada et al. | 501/138 |
| 4,610,970 | 9/1986 | Wada et al. | 501/138 |
| 4,610,971 | 9/1986 | Wada et al. | 501/138 |
| 5,075,819 | 12/1991 | Saito et al. | 361/321 |
| 5,077,636 | 12/1991 | Saito et al. | 361/321 |
| 5,089,932 | 2/1992 | Saito et al. | 361/321 |
| 5,089,933 | 2/1992 | Saito et al. | 501/138 |
| 5,103,369 | 4/1992 | Saito et al. | 361/321 |
| 5,103,370 | 4/1992 | Saito et al. | 501/137 |

FOREIGN PATENT DOCUMENTS

| | | |
|---|---|---|
| 0290859 | 4/1988 | European Pat. Off. . |
| 0431531 | 12/1990 | European Pat. Off. . |
| 0517213 | 6/1992 | European Pat. Off. . |
| 143515 | 8/1983 | Japan . |
| 3224105 | 9/1988 | Japan . |
| 1176278 | 7/1989 | Japan . |
| 276761 | 3/1990 | Japan . |
| 276762 | 3/1990 | Japan . |
| 276763 | 3/1990 | Japan . |
| 276764 | 3/1990 | Japan . |
| 276767 | 3/1990 | Japan . |
| 276768 | 3/1990 | Japan . |
| 276773 | 3/1990 | Japan . |
| 276774 | 3/1990 | Japan . |
| 3109256 | 5/1991 | Japan . |

*Primary Examiner*—Karl Group
*Assistant Examiner*—Deborah Jones
*Attorney, Agent, or Firm*—Townsend & Banta

[57] ABSTRACT

A miniaturized ceramic capacitor having excellent electric characteristics and substantial capacity can be obtained by firing under a non-oxidative atmosphere at a temperature of up to 1200° C. A dielectric layer of this ceramic capacitor consists of a basic component of 100 parts by weight and an additional component of 0.2 to 5 parts by weight. The basic component consists essentially of a material represented by the following formula:

$$\{(Ba_{1-w-x}Ca_wMg_x)O\}k(Ti_{1-y-z}Zr_yR_z)O_{2-z/2}$$

The additional component consists essentially of $Li_2O$—$SiO_2$—MO, $B_2O_3$—$SiO_2$—MO or $B_2O_3$—$SiO_2$—$Li_2O$.

6 Claims, 2 Drawing Sheets

CERAMIC CAPACITOR AND METHOD FOR FABRICATING THE SAME

BACKGROUND OF THE INVENTION

1. Field of the Invention

The invention relates to a ceramic capacitor having a one-layer structure or a laminated structure in which one or more than one dielectric ceramic layer is (are) sandwiched between two or more internal electrodes, and a method for fabricating the same.

2. Description Of Related Art

In a conventional method for fabricating a laminated ceramic capacitor, a desired pattern of conductive paste consisting mainly of noble metal such as platinum or palladium is printed on a non-sintered ceramic sheet (a green sheet) consisting essentially of dielectric ceramic material powder. Then, a plural number of the green sheets are laminated, pressed and attached to each other, and the laminated green sheets are fired at a temperature in the range of 1300° C. to 1600° C. under an oxidative atmosphere. The non-sintered ceramic sheets become dielectric ceramic layers by the firing and the conductive paste becomes an internal electrode by the firing.

As described above, by adopting the conductive paste consisting mainly of noble metal such as platinum or palladium, a desired conductive internal electrode can be obtained without oxidation thereof even if the material thereof is fired at a high temperature in the range of 1300° C. to 1600° C. under an oxidative atmosphere.

However, noble metals such as platinum or palladium are expensive, so that the laminated ceramic capacitor become very costly.

In order to resolve the problem described above, the applicants of the present invention have proposed several solutions in Japanese Patent Publication No. 20851/85, Japanese Patent Provisional Publication No. 147404/86, Japanese Patent Provisional Publication No. 147405/86, and Japanese Patent Provisional Publication No. 147406/86.

Japanese Patent Publication No. 20851/85 discloses dielectric ceramic compositions including basic components consisting essentially of

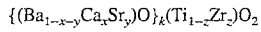

and additional components consisting essentially of $Li_2O$, $SiO_2$ and MO (MO is one or more than one kind of oxide selected from the group consisting of BaO, CaO and SrO).

Japanese Patent Provisional Publication No. 147404/86 discloses dielectric ceramic compositions including basic components consisting essentially of

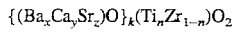

and additional components consisting essentially of $B_2O_3$, $SiO_2$ and $Li_2O$.

Japanese Patent Provisional Publication No. 147405/86 discloses dielectric ceramic compositions including basic components consisting essentially of

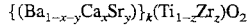

and additional components consisting essentially of $B_2O_3$ and $SiO_2$.

Japanese Patent Provisional Publication No. 147406/86 discloses dielectric ceramic compositions including basic components consisting essentially of

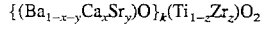

and additional components consisting essentially of $B_2O_3$, $SiO_2$ and MO (MO is one or more than one kind of oxide selected from the group consisting essentially of BaO, CaO and SrO).

The dielectric ceramic compositions disclosed in these Publications have a dielectric constant $\epsilon_s$ of at least 5000, and a resistivity $\rho$ of at least $1\times10^6$ MΩ·cm. By using one of the above dielectric ceramic compositions as a dielectric layer and a conductive paste consisting mainly of base metal such as nickel (Ni) as internal electrodes and firing same at a temperature of up to 1200° C. under a reductive (non-oxidative atmosphere), ceramic capacitors with improved electric characteristics can be obtained at a low cost.

Recently, electric circuits have become highly dense. These circuits require miniaturization of ceramic capacitors, especially those having a laminated structure. It has been desired to make the dielectric constant $\epsilon_s$ of the dielectric ceramic compositions still larger, without degrading the other electric characteristics below those of the dielectric ceramic compositions disclosed in the above cited references.

SUMMARY OF THE INVENTION

An improved ceramic capacitor is provided with a dielectric ceramic composition having a dielectric constant $\epsilon_s$ of at least 7000, a dielectric loss (tan δ) of up to 2.5%, and a resistivity $\rho$ of at least $1\times10^6$ MΩ·cm, by firing the composition up to 1200° C. in a non-oxidative atmosphere. The dielectric ceramic composition consists essentially of a fired mixture of a basic component of 100 parts by weight and 0.2 to 5 parts by weight of an additional component. The basic component consisting essentially of a material represented by the following formula:

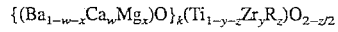

where, R is one or more elements selected from the group consisting of Sc, Y, Gd, Dy, Ho, Er, Yb, Tb, Tm and Lu; and w, x, y, z and k are numerals fulfilling the following conditions:

0.00 ≤ w ≤ 0.27

0.001 ≤ x ≤ 0.03

0.05 ≤ y ≤ 0.26

0.002 ≤ z ≤ 0.04

1.00 ≤ k ≤ 1.04

The additional component consists essentially of $Li_2O$, $SiO_2$ and MO, wherein said MO is at least one oxide selected from the group consisting of BaO, SrO, CaO, MgO and ZnO.

DESCRIPTION OF THE PREFERRED EMBODIMENTS

Figure 1:
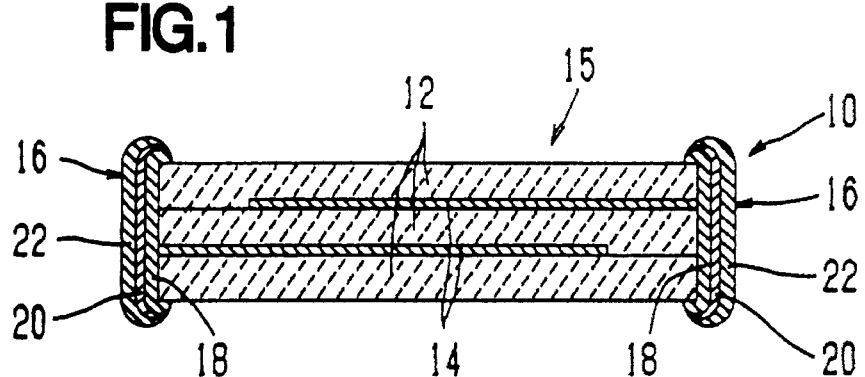
FIG. 1 is a cross sectional view illustrating an example of a laminated ceramic capacitor according to the present invention.

According to a first preferred embodiment, the ceramic capacitor includes at least one dielectric ceramic layer consisting essentially of a dielectric ceramic composition and at least two internal electrodes in the dielectric ceramic composition.

The dielectric ceramic composition consists essentially of a fired mixture of a basic component of 100.0 parts by weight and an additional component in the range of 0.2 to 5.0 parts by weight.

The basic component consisting essentially of a material represented by the following formula:

$$\{(Ba_{1-w-x}Ca_wMg_x)O\}_k(Ti_{1-y-z}Zr_yR_z)O_{2-z/2}$$

where, R is one or more elements selected from the group consisting of Sc, Y, Gd, Dy, Ho, Er, Yb, Tb, Tm and Lu, and, w, x, y, z and k are numerals fulfilling the following conditions:

$0.00 \leq w \leq 0.27$ $0.001 \leq x \leq 0.03$ $0.05 \leq y \leq 0.26$ $0.002 \leq z \leq 0.04$ $1.00 \leq k \leq 1.04$ The an additional component consists essentially of $Li_2O$, $SiO_2$ and MO (MO is at least one oxide selected from the group consisting of BaO, SrO, CaO, MgO and ZnO).

The range of the ratio of the amounts of $Li_2O$, $SiO_2$ and MO in the additional component is represented by an area having five vertexes in the ternary system diagram of mol % as follows:

the first vertex A where the amount of $Li_2O$ is 1 mol %, $SiO_2$ is 80 mol % and MO is 19 mol %;

the second vertex B where the amount of $Li_2O$ is 1 mol %, $SiO_2$ is 39 mol % and MO is 60 mol %;

the third vertex C where the amount of $Li_2O$ is 30 mol %, $SiO_2$ is 30 mol % and MO is 40 mol %;

the fourth vertex D where the amount of $Li_2O$ is 50 mol %, $SiO_2$ is 50 mol % and MO is 0 mol %; and the fifth vertex E where the amount of $Li_2O$ is 20 mol %, $SiO_2$ is 80 mol % and MO is 0 mol %.

A dielectric ceramic composition having the desired electric characteristics, i.e. a high dielectric constant $\epsilon_s$, and a high resistivity $\rho$ can be obtained on the condition of $0.00 \leq w \leq 0.27$ (w represents the ratio of Ca in the composition formula of the basic component). However, if w is larger that 0.27 the firing temperature will be high (up to 1250° C.), and the dielectric constant $\epsilon_s$ will be smaller than 7000.

Ca is added mainly to make the temperature characteristics of the ceramic capacitor flat and to improve the resistivity $\rho$. However, sintered materials having desired electric characteristics can be obtained without the addition of Ca. In such cases the lower limit of w is 0.00.

A dielectric ceramic composition having the desired electric characteristics can be obtained on the condition of $0.001 \leq x \leq 0.03$ (x represents the ratio of Mg in the composition formula of the basic component). However, the dielectric constant $\epsilon_s$ drops to less than 7000, if x is larger than 0.03.

Mg can shift the Curie point to a lower temperature, make the temperature characteristics flat, and improve the resistivity $\rho$. There is observed a significant effect if x is smaller than 0.03, even in the vicinity of 0. However, it is desirable that x is at least 0.001 since the electric characteristics should not vary with mass produced capacitors.

A dielectric ceramic composition having desired electric characteristics can be obtained on the condition of $0.05 \leq y \leq 0.26$ (y represents the ratio of Zr in the composition formula of the basic component). However, the dielectric constant $\epsilon_s$ is smaller than 7000, if y is smaller than 0.05 or larger than 0.26.

A dielectric ceramic composition having desired electric characteristics can be obtained on the condition of $0.002 \leq z \leq 0.04$ (z represents the ratio of R in the composition formula of the basic component). However, the dielectric loss (tan $\delta$) becomes considerable and the resistivity $\rho$ is smaller than $1 \times 10^4$ MΩ·cm, if z is smaller than 0.002. On the other hand, if z is larger than 0.04, a dense sintered material cannot be obtained, even if the firing temperature is 1250° C.

The R component Sc, Y, Gd, Dy, Ho, Er, Yb, Tb, Tm, and Lu perform almost the same function, so that any one or more of them can be used. Tb, Tm, and Lu are not involved in Table 3 shown hereinafter, but they have the same effect as the other R components.

A dielectric ceramic composition having desired electric characteristics can be obtained on the condition of $1.00 \leq k \leq 1.04$ (k represents the ratio of $\{(Ba_{1-w-x}Ca_w Mg_x)O\}$ in the composition formula of the basic component). However, the resistivity $\rho$ becomes smaller than $1 \times 10^6$ MΩ·cm and tan $\delta$ becomes large, if k is smaller than 1.00. On the other hand, a dense sintered material cannot be obtained, even if the firing temperature is 1250° C., if k is larger than 1.04.

A small amount (desirably in the range of 0.05 to 0.01 weight %) of mineralizers such as $MnO_2$ may be added to the basic component to improve the sintering characteristic thereof so long as the materializers do not interfere with the electric characteristics of the capacitor. Other materials may be also added if necessary. The starting materials for the basic component may include oxides, hydroxides or other compounds, in addition to the compounds described in the preferred embodiments herein.

If the amount of the additional component is in the range of 0.2 to 5.0 parts by weight in 100 parts by weight of the basic component, a sintered material having desired electric characteristics can be obtained by firing at a temperature in the range of 1190° C. to 1200° C. However, a dense sintered material cannot be obtained, even if the firing temperature is 1250° C., if the amount of the additional component is smaller than 0.2 parts by weight. On the other hand, the dielectric constant $\epsilon_s$ becomes smaller than 7000, if the amount of the additional component is larger than 5.0 parts by weight.

A sintered material having desired electric characteristics can be obtained if the ratio between the amounts of $Li_2O$, $SiO_2$ and MO in the additional component is within the area in the ternary system diagram of mol % described above. However, a dense sintered material cannot be obtained, if the ratio of these components is out of the circumscribed area. The MO component may be one or more metal oxides selected from the group consisting of BaO, SrO, CaO, MgO and ZnO, in the proper ratio.

The second preferred embodiment is a ceramic capacitor having at least one dielectric ceramic layer consisting essentially of a dielectric ceramic composition and at least two internal electrodes in the dielectric ceramic composition.

The dielectric ceramic composition consists essentially of a fired mixture of a basic component of 100.0 parts by weight and an additional component in the range of 0.2 to 5.0 parts by weight.

The basic component consists essentially of a material represented by the following formula:

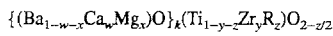

where, R is one or more elements selected from the group consisting of Sc, Y, Gd, Dy, Ho, Er, Yb, Tb, Tm and Lu, and, w, x, y, z and k are numerals fulfilling the following conditions:

$0.00 \leq w \leq 0.27$ $0.001 \leq x \leq 0.03$ $0.05 \leq y \leq 0.26$ $0.002 \leq z \leq 0.04$ $1.00 \leq k \leq 1.04$ The additional component consists essentially of $B_2O_3$, $SiO_2$ and MO (MO is at least one oxide selected from the group consisting of BaO, SrO, CaO, MgO and ZnO.

The range in the ratio of the amounts of $B_2O_3$, $SiO_2$ and MO in the additional component is represented by an area having six vertexes in the ternary system diagram of mol %, as follows:

the first vertex F where the amount of $B_2O_3$ is 1 mol %, $SiO_2$ is 80 mol % and MO is 19 mol %;

the second vertex G where the amount of $B_2O_3$ is 1 mol %, $SiO_2$ is 39 mol % and MO is 60 mol %;

the third vertex H where the amount of $B_2O_3$ is 30 mol %, $SiO_2$ is 0 mol % and MO is 70 mol %;

the fourth vertex I where the amount of $B_2O_3$ is 90 mol %, $SiO_2$ is 0 mol % and MO is 10 mol %;

the fifth vertex J where the amount of $B_2O_3$ is 90 mol %, $SiO_2$ is 10 mol % and MO is 0 mol %; and the sixth vertex K where the amount of $B_2O_3$ is 20 mol %, $SiO_2$ is 80 mol % and MO is 0 mol %.

In the second preferred embodiment, the content of both the basic component and the additional component are the same as in the first preferred embodiment. A sintered material having desired electric characteristics can be obtained if the ratio of the amounts of $B_2O_3$, $SiO_2$ and MO in the additional component is within the area in the ternary system diagram of mol % described above. However, a dense sintered material cannot be obtained, if the ratio of the additional component is out of the above described range. The MO component may be one or more of the metal oxides selected from the group consisting of BaO, SrO, CaO, MgO and ZnO, in the proper amount.

The third preferred embodiment, the ceramic capacitor, includes at least one dielectric ceramic layer consisting essentially of a dielectric ceramic composition and at least two internal electrodes in the dielectric ceramic composition.

The dielectric ceramic composition consists essentially of a fired mixture of a basic component of 100.0 parts by weight and an additional component in the range of 0.2 to 5.0 parts by weight.

The basic component consists essentially of a material represented by the following formula:

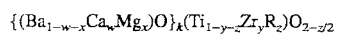

where, R is one or more elements selected from the group consisting of Sc, Y, Gd, Dy, Ho, Er, Yb, Tb, TIn and Lu, and w, x, y, z and k are numerals fulfilling the following conditions:

$0.00 \leq w \leq 0.27$ $0.001 \leq x \leq 0.03$ $0.05 \leq y \leq 0.26$ $0.002 \leq z \leq 0.04$ $1.00 \leq k \leq 1.04$ The additional component consists essentially of $B_2O_3$, $SiO_2$ and $Li_2O$.

The range of the ratio of the amounts of $B_2O_3$, $SiO_2$ and $Li_2O$ in the additional component is represented by an area having six vertexes in the ternary system diagram of mol %, as follows:

the first vertex L where the amount of $B_2O_3$ is 1 mol %, $SiO_2$ is 50 mol % and $Li_2O$ is 49 mol %;

the second vertex M where the amount of $B_2O_3$ is 50 mol %, $SiO_2$ is 1 mol % and $Li_2O$ is 49 mol %;

the third vertex N where the amount of $B_2O_3$ is 80 mol %, $SiO_2$ is 1 mol % and $Li_2O$ is 19 mol %;

the fourth vertex O where the amount of $B_2O_3$ is 89 mol %, $SiO_2$ is 10 mol % and $Li_2O$ is 1 mol %;

the fifth vertex P where the amount of $B_2O_3$ is 19 mol %, $SiO_2$ is 80 mol % and $Li_2O$ is 1 mol %; and the sixth vertex Q where the amount of $B_2O_3$ is 1 mol %, $SiO_2$ is 80 mol % and $Li_2O$ is 19 mol %.

The content of both the basic component and the additional component are the same as in the first preferred embodiment. A sintered material having desired electric characteristics can be obtained if the ratio of the amounts of $B_2O_3$, $SiO_2$ and $Li_2O$ in the additional component is within the area in the ternary system diagram of mol % described above. However, a dense sintered material cannot be obtained if the ratio is outside of this area.

In a fourth preferred embodiment a method is provided for fabricating a ceramic capacitor which includes the steps of providing a mixture of non-sintered ceramic powder consisting essentially of basic and additional components as in the first preferred embodiment herein, forming a non-sintered ceramic sheet consisting of the mixture, fabricating a laminated structure in which the non-sintered ceramic sheet is sandwiched between at least two conductive paste layers, firing the laminated structure under a non-oxidative atmosphere, and heating the fired laminated structure under an oxidative atmosphere.

In a fifth preferred embodiment, a method is provided for fabricating a ceramic capacitor which includes the steps of providing a mixture of non-sintered ceramic powder consisting essentially of basic and additional components as in the second preferred embodiment herein, forming a non-sintered ceramic sheet consisting of the mixture, fabricating a laminated structure in which the non-sintered ceramic sheet is sandwiched between at least two conductive paste layers, firing the laminated structure under a non-oxidative atmosphere, and heating the fired laminated structure under an oxidative atmosphere.

In a sixth preferred embodiment, a method is provided for fabricating a ceramic capacitor which includes the steps of providing a mixture of non-sintered ceramic powder consisting essentially of basic and additional components as in the third embodiment herein, forming a non-sintered ceramic sheet consisting of the mixture, fabricating a laminated structure in which the non-sintered ceramic sheet is sandwiched between at least two conductive paste layers, firing the laminated structure under a non-oxidative atmosphere, and heating the fired laminated structure under an oxidative atmosphere.

In the fourth to sixth preferred embodiments herein, the non-oxidative atmosphere may be a neutral atmosphere such as in $N_2$ or Ar, in addition to a reductive atmosphere such as in $H_2$ or CO. The temperature in the firing under a non-oxidative atmosphere can be changed depending on electrode materials used. If Ni is adopted as the material of the inner electrode, cohesion of Ni particles may be insufficient at temperatures in the range of 1050° C. to 1200° C.

The temperature at which the fired laminated structure is heated under an oxidative atmosphere should be lower than the temperature of the firing under a non-oxidative atmosphere, the preferred temperature being in the range of 500° C. to 1000° C. The oxidative atmosphere is not limited to air. A low oxygen atmosphere, for example, can be used where some ppm of $O_2$ are mixed in $N_2$, or an atmosphere with any oxygen partial pressure can be used. The temperature and the oxygen partial pressure must be changed in consideration of oxidation of the electrode materials such as Ni and the dielectric ceramic materials. Although the temperature of heating the fired laminated structure is 600° C. in the embodiments as described hereinafter, other heating temperatures can be used.

In the preferred embodiments, the heating under a non-oxidative atmosphere and the heating under an oxidative atmosphere are described as being performed in a series of heating steps. However, it is possible that the heating steps can be performed in two different processes.

In the preferred embodiments, Zn is used as the external electrode, but Ni, Ag, and Cu are also available depending on the plating condition of the electrode. Firing of the laminated structure and plating the external electrode can be carried out at the same time by coating the surface of the non-sintered laminated structure with an external electrode of Ni.

Although ceramic capacitors having laminated structures are described herein, the present inventions may be applied generally to ceramic capacitors such as those having a one-layer structure.

Example 1:

Dielectric ceramic compositions in the first and fourth preferred embodiments were prepared.

The composition of Sample No. 1 is shown in Table 3-①.

MAKING THE BASIC COMPONENT

Compounds in Table 1 are weighed, poured into a pot mill with alumina balls and 2.5 l of water, stirred and mixed for 15 hours to obtain a material mixture.

TABLE 1

| compounds | weight (g) | mol portion |
|---|---|---|
| $BaCO_3$ | 657.81 | 93.425 |
| $CaCO_3$ | 25.25 | 7.07 |
| MgO | 0.73 | 0.505 |
| $TiO_2$ | 236.62 | 83.0 |
| $ZrO_2$ | 65.95 | 15.0 |
| $Er_2O_3$ | 13.65 | 1.0 |

The values of the weight (g) of the compounds in Table 1 are calculated so that the composition formula of the basic component:

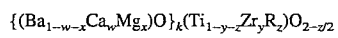

becomes:

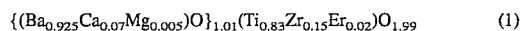
(1)

Next, the material mixture is poured into a stainless pot and dried for 4 hours at 150° C. using a hot blast drier. The dried material mixture is roughly ground and then baked for 2 hours at 1200° C. in air using a tunnel furnace. The powder of the basic component in the composition formula (1) is obtained.

MAKING THE ADDITIONAL COMPONENT

The compounds in Table 2 are weighed, mixed with 300 cc of alcohol, and stirred for 10 hours in a polyethylene pot using aluminum balls to obtain the desired mixture.

TABLE 2

| compounds | weight (g) | mol portion |
|---|---|---|
| $Li_2O$ | 0.44 | 1 |
| $SiO_2$ | 70.99 | 80 |
| $BaCO_3$ | 11.10 | 3.8 |
| $CaCO_3$ | 14.70 | 9.5 |
| MgO | 3.40 | 5.7 |

The values of the weight (g) of the compounds in Table 2 are calculated so that the $Li_2O$ is 1 mol %, $SiO_2$ is 80% mol %, and MO is 19 mol % {BaO (3.8 mol %)+CaO (9.5 mol %)+MgO (5.7 mol %)}. The proportions of BaO, CaO and MgO in MO is 20 mol %, 50 mol % and 30 mol %, respectively.

The mixture is baked for two hours at 1000° C. in air and then poured into an alumina pot with 300 cc of water and ground for 15 hours using alumina balls. The ground mixture is dried for 4 hours at 150° C., and a powder of the additional component is obtained.

MAKING SLURRY 2 parts by weight (20 g) of the additional component is added to 100 parts by weight (1000 g) of the basic component. Then, the mixture of the basic and additional components are mixed with 15 weight % of organic binder consisting of an aqueous solution of acryl acid ester polymer, glycerin and condensed phosphate and 50 weight % of water. The resulting mixture is poured into a ball mill, ground and mixed to obtain a slurry of a dielectric ceramic material.

MAKING NON-SINTERED CERAMIC SHEET

The slurry is poured into a vacuum foam remover and the foam is removed therefrom. The defoamed slurry is then poured into a reverse roll coater to form a molded thin sheet which is continuously laid on a long polyester film. The molded thin sheet is heated to 100° C. on the polyester film until it is dry, and a non-sintered ceramic sheet having a thickness of approximately 25 μm is obtained. The non-sintered ceramic sheet having a large length is cut into 10 cm square segments.

MAKING AND PRINTING CONDUCTIVE PASTE

A mixture of 10 g of Ni powder having an average particle diameter of 1.5 μm and 0.9 g of ethylcellulose dissolved in 9.1 g of butylcarbitol is placed in a stirrer and mixed for 10 hours to obtain a conductive paste for internal electrodes. The conductive paste is printed on one surface of the non-sintered ceramic sheet through a screen having 50 patterns, each of which is 14 mm in length and 7 mm in width. The printed sheet is then dried.

LAMINATING THE NON-SINTERED CERAMIC SHEET

Two of the non-sintered ceramic sheets are laminated by facing the printed surfaces thereof upward so that the printed patterns of the upper and lower sheets are shifted from one another by a half length of the longer side of one pattern. Four of the non-sintered sheets having a total thickness of 60 μm are then laminated on each surface of the laminated sheets thus obtained by laminating the two single sheets.

PRESSURE WELDING AND CUTTING THE LAMINATED SHEETS

The laminated sheets are pressure welded by compression of approximately 40 tons in the direction of the thickness at approximately 50° C. The laminated sheets are then cut into lattices to obtain fifty laminated chips.

FIRING THE LAMINATED CHIP

The laminated chips are heated in a furnace in which an atmosphere firing can be carried out. The temperature is increased by 100° C./h to 600° C. in air to oxidize and remove the organic binder of the non-sintered ceramic sheet.

Then, the atmosphere of the furnace is changed from air to a reductive atmosphere of $H_2$ (2 volume %)+$N_2$ (98 volume %). The temperature is increased by 100° C./h from 600° C. to 1150° C. in the reducible atmosphere, the highest temperature of 1150° C. being maintained for 3 hours. The temperature is then reduced by 100° C./h to 600°, and the reductive atmosphere is changed to air (the oxidative atmosphere), and the temperature of 600° C. is maintained for 30 minutes to oxidize the laminated chip. Finally, the temperature is decreased to room temperature, and a laminated fired chip is obtained.

FABRICATING EXTERNAL ELECTRODES

A pair of external electrodes are fabricated on the side where the laminated fired chips face each other and the edge of the internal electrodes is exposed. As shown in FIG. 1, the laminated ceramic capacitor 10 consists of a laminated fired chip 15 consisting of a 3-layer dielectric ceramic layer 12, 12, 12, and a 2-layer internal electrode 14, 14 on which a pair of external electrodes 16, 16 are formed.

The conductive paste consisting of zinc, glass, frit and vehicle is coated on the side surfaces of the laminated fired chip in which the internal electrodes are exposed to the outside, and then dried. The chip is burned for 15 minutes at 550° C. in air to form a zinc electrode 18. Copper layer 20 is formed on the zinc electrode 18 by non-electrolytic plating, and a Pb-Sn solder layer 22 is formed on the copper layer 20 by electric plating. Thus, a pair of external electrodes 16 are fabricated.

The thickness of the dielectric ceramic layer 12 in the laminated ceramic capacitor 10 is 0.02 mm, and a facing area of a pair of the internal electrodes 14 is 5 mm×5 mm=25 mm². The composition of the dielectric ceramic layer 12 after being sintered is substantially the same as the mixed composition of the basic and additional component before being sintered.

MEASUREMENTS OF ELECTRIC CHARACTERISTICS

The measurements of electric characteristics of the laminated ceramic capacitor 10 were carried out. The results of these measurements are shown in Table 4-①. It can be seen that the dielectric constant $\epsilon_s$ is 14700, tan δ is 1.3%, and resistivity ρ is $3.46 \times 10^6$ MΩ·cm.

The measurements of the electric characteristics are carried out in accordance with the procedure described below.

(A) The dielectric constant $\epsilon_s$ is calculated based on the capacitance measured at 20° C., a frequency 1 kHz, a voltage (effective value) 1.0v, a facing area 25 mm² of the pair of the internal electrodes 14, 14, and a thickness 0.02 mm of the dielectric ceramic layer 12 between the pair of the internal electrodes 14, 14.

(B) The dielectric loss (tan δ) (%) is measured under the same conditions as the measurement of the dielectric constant $\epsilon_s$ as described above.

(C) The resistivity ρ (M Ω·cm) is calculated based on the resistance between the pair of external electrodes 16, 16 measured after applying DC 100 V at 20° C. for 1 minute.

The method for making Sample No. 1 and the characteristics thereof have been described above. As for Samples No. 2 to 100, laminated ceramic capacitors are fabricated by the same method as that of Sample No. 1 except that the compositions of the basic component are varied as shown in ① to ⑥ of Table 3, the compositions of the additional component are varied as shown in ① to ⑥ of Table 4. The electric characteristics are measured under the same conditions as Sample No. 1. The temperatures of firing and the electric characteristics of Samples No. 1 to 100 are shown in ① to ⑥ of Table 4.

TABLE 3

| | Basic Component | | | | | | | | | | | | | |
|---|---|---|---|---|---|---|---|---|---|---|---|---|---|---|
| | Ba | Ca | Mg | Ti | Zr | z | | | | | | | | |
| Sample No. | 1 − w − x | w | x | 1 − y − z | y | Sc | Y | Gd | Dy | Ho | Er | Yb | total | K |
| 1 | 0.925 | 0.07 | 0.005 | 0.830 | 0.15 | 0.000 | 0.000 | 0.000 | 0.000 | 0.000 | 0.020 | 0.000 | 0.020 | 1.01 |
| 2 | 0.925 | 0.07 | 0.005 | 0.830 | 0.15 | 0.000 | 0.000 | 0.000 | 0.000 | 0.000 | 0.020 | 0.000 | 0.020 | 1.01 |
| 3 | 0.925 | 0.07 | 0.005 | 0.830 | 0.15 | 0.000 | 0.000 | 0.000 | 0.000 | 0.000 | 0.020 | 0.000 | 0.020 | 1.01 |
| 4 | 0.925 | 0.07 | 0.005 | 0.830 | 0.15 | 0.000 | 0.000 | 0.000 | 0.000 | 0.000 | 0.020 | 0.000 | 0.020 | 1.01 |
| 5 | 0.925 | 0.07 | 0.005 | 0.830 | 0.15 | 0.000 | 0.000 | 0.000 | 0.000 | 0.000 | 0.020 | 0.000 | 0.020 | 1.01 |
| 6 | 0.925 | 0.07 | 0.005 | 0.830 | 0.15 | 0.000 | 0.000 | 0.000 | 0.000 | 0.000 | 0.020 | 0.000 | 0.020 | 1.01 |
| 7 | 0.925 | 0.07 | 0.005 | 0.830 | 0.15 | 0.000 | 0.000 | 0.000 | 0.000 | 0.000 | 0.020 | 0.000 | 0.020 | 1.01 |
| 8 | 0.925 | 0.07 | 0.005 | 0.830 | 0.15 | 0.000 | 0.000 | 0.000 | 0.000 | 0.000 | 0.020 | 0.000 | 0.020 | 1.01 |
| 9 | 0.925 | 0.07 | 0.005 | 0.830 | 0.15 | 0.000 | 0.000 | 0.000 | 0.000 | 0.000 | 0.020 | 0.000 | 0.020 | 1.01 |
| 10 | 0.925 | 0.07 | 0.005 | 0.830 | 0.15 | 0.000 | 0.000 | 0.000 | 0.000 | 0.000 | 0.020 | 0.000 | 0.020 | 1.01 |
| *11 | 0.925 | 0.07 | 0.005 | 0.830 | 0.15 | 0.000 | 0.000 | 0.000 | 0.000 | 0.000 | 0.020 | 0.000 | 0.020 | 1.01 |
| *12 | 0.925 | 0.07 | 0.005 | 0.830 | 0.15 | 0.000 | 0.000 | 0.000 | 0.000 | 0.000 | 0.020 | 0.000 | 0.020 | 1.01 |

TABLE 3-continued

| | Basic Component | | | | | | | | | | | | | |
|---|---|---|---|---|---|---|---|---|---|---|---|---|---|---|
| | Ba | Ca | Mg | Ti | Zr | | | | z | | | | | |
| Sample No. | 1 − w − x | w | x | 1 − y − z | y | Sc | Y | Gd | Dy | Ho | Er | Yb | total | K |
| *13 | 0.925 | 0.07 | 0.005 | 0.830 | 0.15 | 0.000 | 0.000 | 0.000 | 0.000 | 0.000 | 0.020 | 0.000 | 0.020 | 1.01 |
| *14 | 0.925 | 0.07 | 0.005 | 0.830 | 0.15 | 0.000 | 0.000 | 0.000 | 0.000 | 0.000 | 0.020 | 0.000 | 0.020 | 1.01 |
| *15 | 0.925 | 0.07 | 0.005 | 0.830 | 0.15 | 0.000 | 0.000 | 0.000 | 0.000 | 0.000 | 0.020 | 0.000 | 0.020 | 1.01 |
| *16 | 0.925 | 0.07 | 0.005 | 0.830 | 0.15 | 0.000 | 0.000 | 0.000 | 0.000 | 0.000 | 0.020 | 0.000 | 0.020 | 1.01 |
| 17 | 0.925 | 0.07 | 0.005 | 0.830 | 0.15 | 0.000 | 0.000 | 0.000 | 0.000 | 0.000 | 0.020 | 0.000 | 0.020 | 1.01 |
| 18 | 0.925 | 0.07 | 0.005 | 0.830 | 0.15 | 0.000 | 0.000 | 0.000 | 0.000 | 0.000 | 0.020 | 0.000 | 0.020 | 1.01 |
| 19 | 0.925 | 0.07 | 0.005 | 0.830 | 0.15 | 0.000 | 0.000 | 0.900 | 0.000 | 0.000 | 0.020 | 0.000 | 0.020 | 1.01 |
| 20 | 0.925 | 0.07 | 0.005 | 0.830 | 0.15 | 0.000 | 0.000 | 0.000 | 0.000 | 0.000 | 0.020 | 0.000 | 0.020 | 1.01 |
| 21 | 0.925 | 0.07 | 0.005 | 0.830 | 0.15 | 0.000 | 0.000 | 0.000 | 0.000 | 0.000 | 0.020 | 0.000 | 0.020 | 1.01 |
| 22 | 0.925 | 0.07 | 0.005 | 0.830 | 0.15 | 0.000 | 0.000 | 0.000 | 0.000 | 0.000 | 0.020 | 0.000 | 0.020 | 1.01 |
| 23 | 0.925 | 0.07 | 0.005 | 0.830 | 0.15 | 0.000 | 0.000 | 0.000 | 0.000 | 0.000 | 0.020 | 0.000 | 0.020 | 1.01 |
| *24 | 0.925 | 0.07 | 0.005 | 0.830 | 0.15 | 0.000 | 0.000 | 0.000 | 0.000 | 0.000 | 0.020 | 0.000 | 0.020 | 1.01 |
| 25 | 0.925 | 0.07 | 0.005 | 0.830 | 0.15 | 0.000 | 0.000 | 0.000 | 0.000 | 0.000 | 0.020 | 0.000 | 0.020 | 1.01 |
| 26 | 0.925 | 0.07 | 0.005 | 0.830 | 0.15 | 0.000 | 0.000 | 0.000 | 0.000 | 0.000 | 0.020 | 0.000 | 0.020 | 1.01 |
| 27 | 0.925 | 0.07 | 0.005 | 0.830 | 0.15 | 0.000 | 0.000 | 0.000 | 0.000 | 0.000 | 0.020 | 0.000 | 0.020 | 1.01 |
| 28 | 0.925 | 0.07 | 0.005 | 0.830 | 0.15 | 0.000 | 0.000 | 0.000 | 0.000 | 0.000 | 0.020 | 0.000 | 0.020 | 1.01 |
| *29 | 0.925 | 0.07 | 0.005 | 0.830 | 0.15 | 0.000 | 0.000 | 0.000 | 0.000 | 0.000 | 0.020 | 0.000 | 0.020 | 1.01 |
| *30 | 0.795 | 0.20 | 0.005 | 0.810 | 0.18 | 0.000 | 0.010 | 0.000 | 0.000 | 0.000 | 0.000 | 0.000 | 0.010 | 1.03 |
| 31 | 0.795 | 0.20 | 0.005 | 0.810 | 0 18 | 0.000 | 0.010 | 0.000 | 0.000 | 0.000 | 0.000 | 0.000 | 0.010 | 1.03 |
| 32 | 0.795 | 0.20 | 0.005 | 0.810 | 0.18 | 0.000 | 0.010 | 0.000 | 0.000 | 0.000 | 0.000 | 0.000 | 0.010 | 1.03 |
| 33 | 0.795 | 0.20 | 0.005 | 0.810 | 0.18 | 0.000 | 0.010 | 0.000 | 0.000 | 0.000 | 0.000 | 0.000 | 0.010 | 1.03 |
| 34 | 0.795 | 0.20 | 0.005 | 0.810 | 0.18 | 0.000 | 0.010 | 0.000 | 0.000 | 0.000 | 0.000 | 0.000 | 0.010 | 1.03 |
| *35 | 0.795 | 0.20 | 0.005 | 0.810 | 0.18 | 0.000 | 0.010 | 0.000 | 0.000 | 0.000 | 0.000 | 0.000 | 0.010 | 1.03 |
| 36 | 0.990 | 0.00 | 0.010 | 0.850 | 0.13 | 0.000 | 0.000 | 0.000 | 0.000 | 0.020 | 0.000 | 0.000 | 0.020 | 1.02 |
| 37 | 0.970 | 0.02 | 0.010 | 0.850 | 0.13 | 0.000 | 0.000 | 0.000 | 0.000 | 0.020 | 0.000 | 0.000 | 0.020 | 1.02 |
| 38 | 0.890 | 0.10 | 0.010 | 0.850 | 0.13 | 0.000 | 0.000 | 0.000 | 0.000 | 0.020 | 0.000 | 0.000 | 0.020 | 1.02 |
| 39 | 0.790 | 0.20 | 0.010 | 0.850 | 0.13 | 0.000 | 0.000 | 0.000 | 0.000 | 0.020 | 0.000 | 0.000 | 0.020 | 1.02 |
| 40 | 0.720 | 0.27 | 0.010 | 0.850 | 0.13 | 0.000 | 0.000 | 0.000 | 0.000 | 0.020 | 0.000 | 0.000 | 0.020 | 1.02 |
| *41 | 0.690 | 0.30 | 0.010 | 0.850 | 0.13 | 0.000 | 0.000 | 0.000 | 0.000 | 0.020 | 0.000 | 0.000 | 0.020 | 1.02 |
| 42 | 0.995 | 0.00 | 0.005 | 0.790 | 0.20 | 0.000 | 0.000 | 0.000 | 0.010 | 0.000 | 0.000 | 0.000 | 0.010 | 1.00 |
| 43 | 0.975 | 0.02 | 0.005 | 0.790 | 0.20 | 0.000 | 0.000 | 0.000 | 0.010 | 0.000 | 0.000 | 0.000 | 0.010 | 1.00 |
| 44 | 0.895 | 0.10 | 0.005 | 0.790 | 0.20 | 0.000 | 0.000 | 0.000 | 0.010 | 0.000 | 0.000 | 0.000 | 0.010 | 1.00 |
| 45 | 0.795 | 0.20 | 0.005 | 0.790 | 0.20 | 0.000 | 0.000 | 0.000 | 0.010 | 0.000 | 0.000 | 0.000 | 0.010 | 1.00 |
| 46 | 0.725 | 0.27 | 0.005 | 0.790 | 0.20 | 0.000 | 0.000 | 0.000 | 0.010 | 0.000 | 0.000 | 0.000 | 0.010 | 1.00 |
| *47 | 0.695 | 0.30 | 0.005 | 0.790 | 0.20 | 0.000 | 0.000 | 0.000 | 0.010 | 0.000 | 0.000 | 0.000 | 0.010 | 1.00 |
| 48 | 0.949 | 0.05 | 0.001 | 0.870 | 0.10 | 0.000 | 0.000 | 0.000 | 0.000 | 0.030 | 0.000 | 0.000 | 0.030 | 1.01 |
| 49 | 0.945 | 0.05 | 0.005 | 0.870 | 0.10 | 0.000 | 0.000 | 0.000 | 0.000 | 0.030 | 0.000 | 0.000 | 0.030 | 1.01 |
| 50 | 0.940 | 0.05 | 0.010 | 0.870 | 0.10 | 0.000 | 0.000 | 0.000 | 0.000 | 0.030 | 0.000 | 0.000 | 0.030 | 1.01 |
| 51 | 0.930 | 0.05 | 0.020 | 0.870 | 0.10 | 0.000 | 0.000 | 0.000 | 0.000 | 0.030 | 0.000 | 0.000 | 0.030 | 1.01 |
| 52 | 0.920 | 0.05 | 0.030 | 0.870 | 0.10 | 0.000 | 0.000 | 0.000 | 0.000 | 0.030 | 0.000 | 0.000 | 0.030 | 1.01 |
| *53 | 0.910 | 0.05 | 0.040 | 0.870 | 0.10 | 0.000 | 0.000 | 0.000 | 0.000 | 0.030 | 0.000 | 0.000 | 0.030 | 1.01 |
| 54 | 0.869 | 0.13 | 0.001 | 0.815 | 0.18 | 0.000 | 0.000 | 0.000 | 0.000 | 0.000 | 0.000 | 0.005 | 0.005 | 1.01 |
| 55 | 0.865 | 0.13 | 0.005 | 0.815 | 0.18 | 0.000 | 0.000 | 0.000 | 0.000 | 0.000 | 0.000 | 0.005 | 0.005 | 1.01 |
| 56 | 0.860 | 0.13 | 0.010 | 0.815 | 0.18 | 0.000 | 0.000 | 0.000 | 0.000 | 0.000 | 0.000 | 0.005 | 0.005 | 1.01 |
| 57 | 0.850 | 0.13 | 0.020 | 0.815 | 0.18 | 0.000 | 0.000 | 0.000 | 0.000 | 0.000 | 0.000 | 0.005 | 0.005 | 1.01 |
| 58 | 0.840 | 0.13 | 0.030 | 0.815 | 0.18 | 0.000 | 0.000 | 0.000 | 0.000 | 0.000 | 0.000 | 0.005 | 0.005 | 1.01 |
| *59 | 0.830 | 0.13 | 0.040 | 0.815 | 0.18 | 0.000 | 0.000 | 0.000 | 0.000 | 0.000 | 0.000 | 0.005 | 0.005 | 1.01 |
| *60 | 0.940 | 0.05 | 0.010 | 0.950 | 0.03 | 0.000 | 0.000 | 0.020 | 0.000 | 0.000 | 0.000 | 0.000 | 0.020 | 1.01 |
| 61 | 0.940 | 0.05 | 0.010 | 0.930 | 0.05 | 0.000 | 0.000 | 0.020 | 0.000 | 0.000 | 0.000 | 0.000 | 0.020 | 1.01 |
| 62 | 0.940 | 0.05 | 0.010 | 0.830 | 0.15 | 0.000 | 0.000 | 0.020 | 0.000 | 0.000 | 0.000 | 0.000 | 0.020 | 1.01 |
| 63 | 0.940 | 0.05 | 0.010 | 0.720 | 0.26 | 0.000 | 0.000 | 0.020 | 0.000 | 0.000 | 0.000 | 0.000 | 0.020 | 1.01 |
| *64 | 0.940 | 0.05 | 0.010 | 0.690 | 0.29 | 0.000 | 0.000 | 0.020 | 0.000 | 0.000 | 0.000 | 0.000 | 0.020 | 1.01 |
| *65 | 0.845 | 0.15 | 0.005 | 0.930 | 0.03 | 0.000 | 0.040 | 0.000 | 0.000 | 0.000 | 0.000 | 0.000 | 0.040 | 1.03 |
| 66 | 0.845 | 0.15 | 0.005 | 0.910 | 0.05 | 0.000 | 0.040 | 0.000 | 0.000 | 0.000 | 0.000 | 0.000 | 0.040 | 1.03 |
| 67 | 0.845 | 0.15 | 0.005 | 0.810 | 0.15 | 0.000 | 0.040 | 0.000 | 0.000 | 0.000 | 0.000 | 0.000 | 0.040 | 1.03 |
| 68 | 0.845 | 0.15 | 0.005 | 0.700 | 0.26 | 0.000 | 0.040 | 0.000 | 0.000 | 0.000 | 0.000 | 0.000 | 0.040 | 1.03 |
| *69 | 0.845 | 0.15 | 0.005 | 0.670 | 0.29 | 0.000 | 0.040 | 0.000 | 0.000 | 0.000 | 0.000 | 0.000 | 0.040 | 1.03 |
| 70 | 0.920 | 0.07 | 0.010 | 0.870 | 0.12 | 0.010 | 0.000 | 0.000 | 0.000 | 0.000 | 0.000 | 0.000 | 0.010 | 1.02 |
| 71 | 0.920 | 0.07 | 0.010 | 0.870 | 0.12 | 0.000 | 0.010 | 0.000 | 0.000 | 0.000 | 0.000 | 0.000 | 0.010 | 1.02 |
| 72 | 0.920 | 0.07 | 0.010 | 0.870 | 0.12 | 0.000 | 0.000 | 0.010 | 0.000 | 0.000 | 0.000 | 0.000 | 0.010 | 1.02 |
| 73 | 0.920 | 0.07 | 0.010 | 0.870 | 0.12 | 0.000 | 0.000 | 0.000 | 0.010 | 0.000 | 0.000 | 0.000 | 0.010 | 1.02 |
| 74 | 0.920 | 0.07 | 0.010 | 0.870 | 0.12 | 0.000 | 0.000 | 0.000 | 0.000 | 0.010 | 0.000 | 0.000 | 0.010 | 1.02 |
| 75 | 0.920 | 0.07 | 0.010 | 0.870 | 0.12 | 0.000 | 0.000 | 0.000 | 0.000 | 0.000 | 0.010 | 0.000 | 0.010 | 1.02 |
| 76 | 0.920 | 0.07 | 0.010 | 0.870 | 0.12 | 0.000 | 0.000 | 0.000 | 0.000 | 0.000 | 0.000 | 0.010 | 0.010 | 1.02 |
| 77 | 0.920 | 0.07 | 0.010 | 0.870 | 0.12 | 0.000 | 0.005 | 0.000 | 0.005 | 0.000 | 0.000 | 0.000 | 0.010 | 1.02 |
| 78 | 0.920 | 0.07 | 0.010 | 0.870 | 0.12 | 0.000 | 0.000 | 0.002 | 0.000 | 0.004 | 0.000 | 0.004 | 0.010 | 1.02 |
| *79 | 0.848 | 0.15 | 0.002 | 0.929 | 0.07 | 0.000 | 0.000 | 0.000 | 0.000 | 0.000 | 0.000 | 0.001 | 0.001 | 1.01 |
| 80 | 0.848 | 0.15 | 0.002 | 0.928 | 0.07 | 0.000 | 0.000 | 0.000 | 0.000 | 0.000 | 0.000 | 0.002 | 0.002 | 1.01 |
| 81 | 0.848 | 0.15 | 0.002 | 0.925 | 0.07 | 0.000 | 0.000 | 0.000 | 0.000 | 0.000 | 0.000 | 0.005 | 0.005 | 1.01 |
| 82 | 0.848 | 0.15 | 0.002 | 0.910 | 0.07 | 0.000 | 0.000 | 0.000 | 0.000 | 0.000 | 0.000 | 0.020 | 0.020 | 1.01 |
| 83 | 0.848 | 0.15 | 0.002 | 0.890 | 0.07 | 0.000 | 0.000 | 0.000 | 0.000 | 0.000 | 0.000 | 0.040 | 0.040 | 1.01 |
| *84 | 0.848 | 0.15 | 0.002 | 0.870 | 0.07 | 0.000 | 0.000 | 0.000 | 0.000 | 0.000 | 0.000 | 0.060 | 0.060 | 1.01 |
| *85 | 0.950 | 0.03 | 0.020 | 0.869 | 0.13 | 0.000 | 0.000 | 0.000 | 0.001 | 0.000 | 0.000 | 0.000 | 0.001 | 1.02 |

TABLE 3-continued

| | Basic Component | | | | | | | | | | | | | |
|---|---|---|---|---|---|---|---|---|---|---|---|---|---|---|
| | Ba | Ca | Mg | Ti | Zr | z | | | | | | | | |
| Sample No. | 1 − w − x | w | x | 1 − y − z | y | Sc | Y | Gd | Dy | Ho | Er | Yb | total | K |
| 86 | 0.950 | 0.03 | 0.020 | 0.868 | 0.13 | 0.000 | 0.000 | 0.000 | 0.002 | 0.000 | 0.000 | 0.000 | 0.002 | 1.02 |
| 87 | 0.950 | 0.03 | 0.020 | 0.865 | 0.13 | 0.000 | 0.000 | 0.000 | 0.005 | 0.000 | 0.000 | 0.000 | 0.005 | 1.02 |
| 88 | 0.950 | 0.03 | 0.020 | 0.850 | 0.13 | 0.000 | 0.000 | 0.000 | 0.020 | 0.000 | 0.000 | 0.000 | 0.020 | 1.02 |
| 89 | 0.950 | 0.03 | 0.020 | 0.830 | 0.13 | 0.000 | 0.000 | 0.000 | 0.040 | 0.000 | 0.000 | 0.000 | 0.40 | 1.02 |
| *90 | 0.950 | 0.03 | 0.020 | 0.810 | 0.13 | 0.000 | 0.000 | 0.000 | 0.060 | 0.000 | 0.000 | 0.000 | 0.060 | 1.02 |
| *91 | 0.940 | 0.05 | 0.010 | 0.810 | 0.18 | 0.000 | 0.010 | 0.000 | 0.000 | 0.000 | 0.000 | 0.000 | 0.010 | 0.99 |
| 92 | 0.940 | 0.05 | 0.010 | 0.810 | 0.18 | 0.000 | 0.010 | 0.000 | 0.000 | 0.000 | 0.000 | 0.000 | 0.010 | 1.00 |
| 93 | 0.940 | 0.05 | 0.010 | 0.810 | 0.18 | 0.000 | 0.010 | 0.000 | 0.000 | 0.000 | 0.000 | 0.000 | 0.010 | 1.02 |
| 94 | 0.940 | 0.05 | 0.010 | 0.810 | 0.18 | 0.000 | 0.010 | 0.000 | 0.000 | 0.000 | 0.000 | 0.000 | 0.010 | 1.04 |
| *95 | 0.940 | 0.05 | 0.010 | 0.810 | 0.18 | 0.000 | 0.010 | 0.000 | 0.000 | 0.000 | 0.000 | 0.000 | 0.010 | 1.05 |
| *96 | 0.895 | 0.10 | 0.005 | 0.795 | 0.20 | 0.000 | 0.000 | 0.000 | 0.000 | 0.005 | 0.000 | 0.000 | 0.005 | 0.99 |
| 97 | 0.895 | 0.10 | 0.005 | 0.795 | 0.20 | 0.000 | 0.000 | 0.000 | 0.000 | 0.005 | 0.000 | 0.000 | 0.005 | 1.00 |
| 98 | 0.895 | 0.10 | 0.005 | 0.795 | 0.20 | 0.000 | 0.000 | 0.000 | 0.000 | 0.005 | 0.000 | 0.000 | 0.005 | 1.02 |
| 99 | 0.895 | 0.10 | 0.005 | 0.795 | 0.20 | 0.000 | 0.000 | 0.000 | 0.000 | 0.005 | 0.000 | 0.000 | 0.005 | 1.04 |
| *100 | 0.895 | 0.10 | 0.005 | 0.795 | 0.20 | 0.000 | 0.000 | 0.000 | 0.000 | 0.005 | 0.000 | 0.000 | 0.005 | 1.05 |

*marks show compared samples

TABLE 4

| | Additional Component | | | | | | | | | Characteristics | | | |
|---|---|---|---|---|---|---|---|---|---|---|---|---|---|
| | Amount weight | Composition (mol %) | | | Content of MO (mol %) | | | | | Temp. of firing | Dielectric constant | tan δ | Resistivity ρ |
| Sample No. | portions | Li$_2$O | SiO$_2$ | MO | BaO | SrO | CaO | MgO | ZnO | (°C.) | ε$_s$ | (%) | (MΩ · cm) |
| 1 | 2.0 | 1 | 80 | 19 | 20 | 0 | 50 | 30 | 0 | 1150 | 14700 | 1.3 | 3.46 × 10$^6$ |
| 2 | 2.0 | 1 | 39 | 60 | 20 | 0 | 50 | 30 | 0 | 1170 | 14300 | 1.2 | 3.19 × 10$^6$ |
| 3 | 2.0 | 30 | 30 | 40 | 20 | 0 | 50 | 30 | 0 | 1150 | 14400 | 1.2 | 3.18 × 10$^6$ |
| 4 | 2.0 | 50 | 50 | 0 | 0 | 0 | 0 | 0 | 0 | 1140 | 15200 | 1.4 | 3.24 × 10$^6$ |
| 5 | 2.0 | 20 | 80 | 0 | 0 | 0 | 0 | 0 | 0 | 1140 | 15500 | 1.5 | 3.64 × 10$^6$ |
| 6 | 2.0 | 10 | 50 | 40 | 20 | 0 | 50 | 30 | 0 | 1160 | 14800 | 1.3 | 3.95 × 10$^6$ |
| 7 | 2.0 | 30 | 40 | 30 | 20 | 0 | 50 | 30 | 0 | 1150 | 15000 | 1.3 | 3.34 × 10$^6$ |
| 8 | 2.0 | 20 | 60 | 20 | 20 | 0 | 50 | 30 | 0 | 1140 | 15200 | 1.3 | 3.76 × 10$^6$ |
| 9 | 2.0 | 35 | 65 | 0 | 0 | 0 | 0 | 0 | 0 | 1150 | 15400 | 1.4 | 3.17 × 10$^6$ |
| 10 | 2.0 | 1 | 59 | 40 | 20 | 0 | 50 | 30 | 0 | 1160 | 15200 | 1.2 | 3.81 × 10$^6$ |
| *11 | 2.0 | 1 | 85 | 14 | 20 | 0 | 50 | 30 | 0 | 1250 | Not coherently sintered on firing | | |
| *12 | 2.0 | 20 | 29 | 51 | 20 | 0 | 50 | 30 | 0 | 1250 | Not coherently sintered on firing | | |
| *13 | 2.0 | 50 | 30 | 20 | 20 | 0 | 50 | 30 | 0 | 1250 | Not coherently sintered on firing | | |
| *14 | 2.0 | 60 | 30 | 10 | 20 | 0 | 50 | 30 | 0 | 1250 | Not coherently sintered on firing | | |
| *15 | 2.0 | 60 | 40 | 0 | 0 | 0 | 0 | 0 | 0 | 1250 | Not coherently sintered on firing | | |
| *16 | 2.0 | 10 | 90 | 0 | 0 | 0 | 0 | 0 | 0 | 1250 | Not coherently sintered on firing | | |
| 17 | 2.0 | 20 | 60 | 20 | 100 | 0 | 0 | 0 | 0 | 1140 | 14500 | 1.2 | 3.68 × 10$^6$ |
| 18 | 2.0 | 20 | 60 | 20 | 0 | 100 | 0 | 0 | 0 | 1140 | 15600 | 1.3 | 2.89 × 10$^6$ |
| 19 | 2.0 | 20 | 60 | 20 | 0 | 0 | 100 | 0 | 0 | 1140 | 15200 | 1.2 | 3.59 × 10$^6$ |
| 20 | 2.0 | 20 | 60 | 20 | 0 | 0 | 0 | 100 | 0 | 1140 | 14600 | 1.2 | 3.91 × 10$^6$ |
| 21 | 2.0 | 20 | 60 | 20 | 0 | 0 | 0 | 0 | 100 | 1140 | 14300 | 1.2 | 3.81 × 10$^6$ |
| 22 | 2.0 | 20 | 60 | 20 | 20 | 20 | 20 | 20 | 20 | 1140 | 14800 | 1.3 | 3.18 × 10$^6$ |
| 23 | 2.0 | 20 | 60 | 20 | 40 | 10 | 20 | 10 | 20 | 1140 | 15500 | 1.4 | 3.51 × 10$^6$ |
| *24 | 0.0 | 0 | 0 | 0 | 0 | 0 | 0 | 0 | 0 | 1250 | Not coherently sintered on firing | | |
| 25 | 0.2 | 15 | 75 | 10 | 30 | 10 | 10 | 30 | 20 | 1190 | 19000 | 1.9 | 2.59 × 10$^6$ |
| 26 | 1.0 | 15 | 75 | 10 | 30 | 10 | 10 | 30 | 20 | 1170 | 17600 | 1.7 | 2.87 × 10$^6$ |
| 27 | 3.0 | 15 | 75 | 10 | 30 | 10 | 10 | 30 | 20 | 1150 | 13700 | 1.1 | 3.62 × 10$^6$ |
| 28 | 5.0 | 15 | 75 | 10 | 30 | 10 | 10 | 30 | 20 | 1100 | 9300 | 0.6 | 5.45 × 10$^6$ |
| *29 | 7.0 | 15 | 75 | 10 | 30 | 10 | 10 | 30 | 20 | 1080 | 4900 | 0.8 | 9.76 × 10$^6$ |
| *30 | 0.0 | 0 | 0 | 0 | 0 | 0 | 0 | 0 | 0 | 1250 | Not coherently sintered on firing | | |
| 31 | 0.2 | 30 | 40 | 30 | 0 | 50 | 50 | 0 | 0 | 1200 | 9800 | 0.9 | 5.10 × 10$^6$ |
| 32 | 1.0 | 30 | 40 | 30 | 0 | 50 | 50 | 0 | 0 | 1170 | 9200 | 0.9 | 5.05 × 10$^6$ |
| 33 | 3.0 | 30 | 40 | 30 | 0 | 50 | 50 | 0 | 0 | 1140 | 8100 | 0.7 | 6.52 × 10$^6$ |
| 34 | 5.0 | 30 | 40 | 30 | 0 | 50 | 50 | 0 | 0 | 1110 | 7100 | 0.7 | 8.21 × 10$^6$ |
| *35 | 7.0 | 30 | 40 | 30 | 0 | 50 | 50 | 0 | 0 | 1080 | 5300 | 0.6 | 9.43 × 10$^6$ |
| 36 | 2.0 | 10 | 50 | 40 | 20 | 20 | 20 | 20 | 20 | 1150 | 15800 | 1.5 | 3.19 × 10$^6$ |
| 37 | 2.0 | 10 | 50 | 40 | 20 | 20 | 20 | 20 | 20 | 1170 | 15400 | 1.4 | 3.30 × 10$^6$ |
| 38 | 2.0 | 10 | 50 | 40 | 20 | 20 | 20 | 20 | 20 | 1170 | 12900 | 1.2 | 4.33 × 10$^6$ |
| 39 | 2.0 | 10 | 50 | 40 | 20 | 20 | 20 | 20 | 20 | 1180 | 11000 | 1.2 | 4.36 × 10$^6$ |
| 40 | 2.0 | 10 | 50 | 40 | 20 | 20 | 20 | 20 | 20 | 1180 | 7600 | 0.8 | 7.41 × 10$^6$ |
| *41 | 2.0 | 10 | 50 | 40 | 20 | 20 | 20 | 20 | 20 | 1250 | 5400 | 0.5 | 8.82 × 10$^6$ |
| 42 | 3.0 | 20 | 60 | 20 | 0 | 100 | 0 | 0 | 0 | 1120 | 12500 | 1.2 | 4.25 × 10$^6$ |

TABLE 4-continued

| | Additional Component | | | | | | | | | Characteristics | | |
|---|---|---|---|---|---|---|---|---|---|---|---|---|
| | Amount weight | Composition (mol %) | | | Content of MO (mol %) | | | | | Temp. of firing | Dielectric constant | tan δ | Resistivity ρ |
| Sample No. | portions | $Li_2O$ | $SiO_2$ | MO | BaO | SrO | CaO | MgO | ZnO | (°C.) | $\epsilon_s$ | (%) | (MΩ · cm) |
| 43 | 3.0 | 20 | 60 | 20 | 0 | 100 | 0 | 0 | 0 | 1150 | 11900 | 0.9 | $4.39 \times 10^6$ |
| 44 | 3.0 | 20 | 60 | 20 | 0 | 100 | 0 | 0 | 0 | 1150 | 10800 | 0.7 | $5.10 \times 10^6$ |
| 45 | 3.0 | 20 | 60 | 20 | 0 | 100 | 0 | 0 | 0 | 1180 | 8400 | 0.6 | $5.74 \times 10^6$ |
| 46 | 3.0 | 20 | 60 | 20 | 0 | 100 | 0 | 0 | 0 | 1180 | 7200 | 0.6 | $7.72 \times 10^6$ |
| *47 | 3.0 | 20 | 60 | 20 | 0 | 100 | 0 | 0 | 0 | 1250 | 5200 | 0.4 | $9.21 \times 10^6$ |
| 48 | 0.5 | 30 | 30 | 40 | 20 | 0 | 50 | 30 | 0 | 1160 | 15200 | 1.4 | $2.97 \times 10^6$ |
| 49 | 0.5 | 30 | 30 | 40 | 20 | 0 | 50 | 30 | 0 | 1160 | 15700 | 1.5 | $2.90 \times 10^6$ |
| 50 | 0.5 | 30 | 30 | 40 | 20 | 0 | 50 | 30 | 0 | 1160 | 14300 | 1.4 | $3.39 \times 10^6$ |
| 51 | 0.5 | 30 | 30 | 40 | 20 | 0 | 50 | 30 | 0 | 1180 | 12400 | 1.2 | $4.08 \times 10^6$ |
| 52 | 0.5 | 30 | 30 | 40 | 20 | 0 | 50 | 30 | 0 | 1180 | 10400 | 1.0 | $5.34 \times 10^6$ |
| *53 | 0.5 | 30 | 30 | 40 | 20 | 0 | 50 | 30 | 0 | 1200 | 3200 | 1.3 | $1.76 \times 10^6$ |
| 54 | 1.0 | 30 | 40 | 30 | 20 | 0 | 50 | 30 | 0 | 1150 | 13300 | 1.2 | $3.82 \times 10^6$ |
| 55 | 1.0 | 30 | 40 | 30 | 20 | 0 | 50 | 30 | 0 | 1150 | 13700 | 1.3 | $3.55 \times 10^6$ |
| 56 | 1.0 | 30 | 40 | 30 | 20 | 0 | 50 | 30 | 0 | 1150 | 11400 | 1.1 | $4.32 \times 10^6$ |
| 57 | 1.0 | 30 | 40 | 30 | 20 | 0 | 50 | 30 | 0 | 1180 | 9800 | 0.9 | $5.10 \times 10^6$ |
| 58 | 1.0 | 30 | 40 | 30 | 20 | 0 | 50 | 30 | 0 | 1180 | 7900 | 0.8 | $6.05 \times 10^6$ |
| *59 | 1.0 | 30 | 40 | 30 | 20 | 0 | 50 | 30 | 0 | 1200 | 2900 | 1.1 | $1.91 \times 10^6$ |
| *60 | 1.0 | 30 | 40 | 30 | 0 | 0 | 0 | 100 | 0 | 1180 | 5300 | 2.0 | $1.03 \times 10^6$ |
| 61 | 1.0 | 30 | 40 | 30 | 0 | 0 | 0 | 100 | 0 | 1180 | 9300 | 1.6 | $4.87 \times 10^6$ |
| 62 | 1.0 | 30 | 40 | 30 | 0 | 0 | 0 | 100 | 0 | 1180 | 17500 | 1.3 | $2.74 \times 10^6$ |
| 63 | 1.0 | 30 | 40 | 30 | 0 | 0 | 0 | 100 | 0 | 1180 | 11500 | 0.8 | $4.36 \times 10^6$ |
| *64 | 1.0 | 30 | 40 | 30 | 0 | 0 | 0 | 100 | 0 | 1180 | 5400 | 0.4 | $9.28 \times 10^6$ |
| *65 | 3.0 | 35 | 55 | 10 | 100 | 0 | 0 | 0 | 0 | 1150 | 5200 | 1.6 | $1.02 \times 10^6$ |
| 66 | 3.0 | 35 | 55 | 10 | 100 | 0 | 0 | 0 | 0 | 1150 | 8200 | 1.9 | $6.64 \times 10^6$ |
| 67 | 3.0 | 35 | 55 | 10 | 100 | 0 | 0 | 0 | 0 | 1150 | 12600 | 1.5 | $4.17 \times 10^6$ |
| 68 | 3.0 | 35 | 55 | 10 | 100 | 0 | 0 | 0 | 0 | 1150 | 8400 | 0.6 | $5.48 \times 10^6$ |
| *69 | 3.0 | 35 | 55 | 10 | 100 | 0 | 0 | 0 | 0 | 1150 | 5100 | 0.3 | $9.66 \times 10^6$ |
| 70 | 0.5 | 10 | 50 | 40 | 20 | 20 | 20 | 20 | 20 | 1170 | 13300 | 1.1 | $4.29 \times 10^6$ |
| 71 | 0.5 | 10 | 50 | 40 | 20 | 20 | 20 | 20 | 20 | 1170 | 13800 | 1.1 | $3.29 \times 10^6$ |
| 72 | 0.5 | 10 | 50 | 20 | 20 | 20 | 20 | 20 | 20 | 1170 | 13200 | 1.0 | $3.78 \times 10^6$ |
| 73 | 0.5 | 10 | 50 | 40 | 20 | 20 | 20 | 20 | 20 | 1170 | 13700 | 1.1 | $3.83 \times 10^6$ |
| 74 | 0.5 | 10 | 50 | 40 | 20 | 20 | 20 | 20 | 20 | 1170 | 13500 | 1.0 | $4.13 \times 10^6$ |
| 75 | 0.5 | 10 | 50 | 40 | 20 | 20 | 20 | 20 | 20 | 1170 | 13800 | 0.9 | $3.67 \times 10^6$ |
| 76 | 0.5 | 10 | 50 | 40 | 20 | 20 | 20 | 20 | 20 | 1170 | 13000 | 0.9 | $4.17 \times 10^6$ |
| 77 | 0.5 | 10 | 50 | 40 | 20 | 20 | 20 | 20 | 20 | 1170 | 13600 | 1.1 | $4.26 \times 10^6$ |
| 78 | 0.5 | 10 | 50 | 40 | 20 | 20 | 20 | 20 | 20 | 1170 | 13200 | 0.8 | $4.04 \times 10^6$ |
| *79 | 2.0 | 15 | 75 | 10 | 0 | 0 | 100 | 0 | 0 | 1150 | 6600 | 18.3 | $2.45 \times 10^6$ |
| 80 | 2.0 | 15 | 75 | 10 | 0 | 0 | 100 | 0 | 0 | 1150 | 7200 | 1.4 | $6.25 \times 10^6$ |
| 81 | 2.0 | 15 | 75 | 10 | 0 | 0 | 100 | 0 | 0 | 1150 | 8000 | 1.3 | $5.65 \times 10^6$ |
| 82 | 2.0 | 15 | 75 | 10 | 0 | 0 | 100 | 0 | 0 | 1150 | 11500 | 1.4 | $4.44 \times 10^6$ |
| 83 | 2.0 | 15 | 75 | 10 | 0 | 0 | 100 | 0 | 0 | 1180 | 14800 | 1.9 | $3.34 \times 10^6$ |
| *84 | 2.0 | 15 | 75 | 10 | 0 | 0 | 100 | 0 | 0 | 1250 | Not coherently sintered on firing | | |
| *85 | 4.0 | 30 | 40 | 30 | 0 | 50 | 50 | 0 | 0 | 1150 | 7400 | 5.8 | $4.12 \times 10^6$ |
| 86 | 4.0 | 30 | 40 | 30 | 0 | 50 | 50 | 0 | 0 | 1150 | 8600 | 1.2 | $5.57 \times 10^6$ |
| 87 | 4.0 | 30 | 40 | 30 | 0 | 50 | 50 | 0 | 0 | 1150 | 8900 | 1.0 | $5.63 \times 10^6$ |
| 88 | 4.0 | 30 | 40 | 30 | 0 | 50 | 50 | 0 | 0 | 1180 | 9200 | 0.9 | $5.63 \times 10^6$ |
| 89 | 4.0 | 30 | 40 | 30 | 0 | 50 | 50 | 0 | 0 | 1180 | 7800 | 0.6 | $6.02 \times 10^6$ |
| *90 | 4.0 | 30 | 40 | 30 | 0 | 50 | 50 | 0 | 0 | 1250 | Not coherently sintered on firing | | |
| *91 | 1.0 | 20 | 55 | 25 | 20 | 0 | 50 | 30 | 0 | 1160 | 18000 | 7.2 | $4.12 \times 10^6$ |
| 92 | 1.0 | 20 | 55 | 25 | 20 | 0 | 50 | 30 | 0 | 1160 | 16800 | 1.5 | $3.01 \times 10^6$ |
| 93 | 1.0 | 20 | 55 | 25 | 20 | 0 | 50 | 30 | 0 | 1160 | 16600 | 1.4 | $2.97 \times 10^6$ |
| 94 | 1.0 | 20 | 55 | 25 | 20 | 0 | 50 | 30 | 0 | 1200 | 15300 | 1.8 | $3.57 \times 10^6$ |
| *95 | 1.0 | 20 | 55 | 25 | 20 | 0 | 50 | 30 | 0 | 1250 | Not coherently sintered on firing | | |
| *96 | 0.5 | 20 | 55 | 25 | 20 | 0 | 50 | 30 | 0 | 1180 | 18400 | 8.9 | $3.07 \times 10^6$ |
| 97 | 0.5 | 20 | 55 | 25 | 20 | 0 | 50 | 30 | 0 | 1180 | 18200 | 2.3 | $3.09 \times 10^6$ |
| 98 | 0.5 | 20 | 55 | 25 | 20 | 0 | 50 | 30 | 0 | 1180 | 17800 | 1.7 | $2.57 \times 10^6$ |
| 99 | 0.5 | 20 | 55 | 25 | 20 | 0 | 50 | 30 | 0 | 1200 | 17200 | 1.5 | $2.73 \times 10^6$ |
| *100 | 0.5 | 20 | 55 | 25 | 20 | 0 | 50 | 30 | 0 | 1250 | Not coherently sintered on firing | | |

*marks show compared samples

In ① to ⑥ of Table 3, the column 1−w−x shows the ratio of atoms of Ba in the composition formula of the basic component, the column w shows that of Ca, x shows that of Mg, 1−y−z shows that of Ti, and y shows that of Zr.

The column z shows the ratio of atoms of R in the composition formula of the basic component, and k shows that of {$(Ba_{1-w-x} Ca_w Mg_x)O$}. Sc, Y, Gd, Dy, Ho, Er, and Yb of the column z are the contents of R in the composition formula of the basic component, and each column of the elements shows the ratio of atoms thereof, and the column of the total shows the ratio of total numerals of the atoms (value z).

In ① to ⑥ of Table 4, the added amount of the additional component is represented by parts by weight in the 100 parts by weight of the basic component. The contents of the column MO represent the ratio among BaO, SrO, MgO and ZnO in mol %.

The experiments with the Samples Nos. 1 to 23 show the proper range of the glass in the additional component, and the experiments with the Samples Nos. 24 to 35 show the proper range of the added amount of the glass. The experiments with the Samples Nos. 36 to 47 show the proper range of the value w representing the ratio of Ca, the experiments with the Samples Nos. 48 to 59 show the proper range of the value x representing that of Mg, and the experiments with the Samples Nos. 60 to 69 show the proper range of the value y representing that of Zr. The experiments with the Samples Nos. 70 to 78 show the influence of R, the experiments with Samples Nos. 79 to 90 show the proper range of z representing the ratio of R, and the experiments with Samples Nos. 91 to 100 show the proper range of k representing that of $\{(Ba_{1-w-x}Ca_wMg_x)O\}$.

It is clear from ① to ⑥ of Table 3 and ① to ⑥ of Table 4 that, in the samples according to the present invention, by firing the samples in a non-oxidative atmosphere at a temperature up to 1200° C., a ceramic capacitor having desired electric characteristics can be obtained. These capacitors have a dielectric constant $\epsilon_s$ of at least 7000, a dielectric loss (tan$\delta$) of up to 2.5%, and a resistivity $\rho$ of at least $1\times10^6$ M$\Omega$·cm.

On the other hand, a ceramic capacitor having the desired electric characteristics is not be obtained in Samples Nos. 11 to 16, 24, 29, 30, 35, 41, 47, 53, 59, 60, 64, 65, 69, 79, 84, 85, 90, 91, 95, 96 and 100. Accordingly, these Samples have compositions outside of the range of the present invention.

The proper composition range of the dielectric ceramic material according to the invention will be described in conjunction with the results of the experiments shown in ① to ⑥ of Table 3 and ① to ⑥ of Table 4.

First, the proper range of the value w representing the ratio of atoms of Ca in the composition formula of the basic component will be described.

A dielectric sintered ceramic composition having desired electric characteristics can be obtained, if the value w is 0.27 as shown in Samples Nos. 40 and 46. However, if the value w is 0.30 as shown in Samples Nos. 41 and 47, the firing temperature is as high as 1250° C., and the dielectric constant $\epsilon_s$ is smaller than 7000. Accordingly, the upper limit of w is 0.27.

Ca is added to the composition to produce flat temperature characteristics and improve the resistivity $\rho$. However, a dielectric ceramic material having desired electric characteristics can be obtained even if w is 0. Accordingly, the lower limit of w is 0.

The proper range of x representing the ratio of atoms of Mg in the composition formula of the basic component will be described.

A dielectric ceramic composition having desired electric characteristics can be obtained if x is 0.03 as shown in Samples Nos. 52 and 58. However, x is 0.04 as shown in the Samples Nos. 53 and 59, a dielectric constant $\epsilon_s$ drops rapidly to less than 7000. Accordingly, the upper limit of x is 0.03.

Mg can shift the Curie point to lower temperatures, resulting in flat temperature characteristics and improved resistivity $\rho$. There is observed a significant effect if x is smaller than 0.03, even in the vicinity of 0, but it is desirable that x is 0.001 or more because the electric characteristics cannot be different in the case of mass-production.

The proper range of value y representing the ratio of atoms of Zr in the composition formula of the basic component will be described.

A dielectric ceramic composition having desired electric characteristics can be obtained if y is 0.05 as shown in Samples Nos. 61 and 66. However, if y is 0.03 as shown in Samples Nos. 60 and 65, the dielectric constant $\epsilon_s$ is less than 7000. Accordingly, the lowest limit of y is 0.05.

On the other hand, a dielectric ceramic composition having desired electric characteristics can be obtained if y is 0.26 shown in the Samples Nos. 63 and 68. However, if y is 0.29 as shown in the Samples Nos. 64 and 69, the dielectric constant $\epsilon_s$ is smaller than 7000. Accordingly, the upper limit of y is 0.26.

The proper range of value z representing the ratio of atoms of R in the composition formula in the basic component is described.

A dielectric ceramic composition having desired electric characteristics can be obtained if z is 0.002 as shown in Samples Nos. 80 and 86. However, if z is 0.001 as shown in Samples Nos. 79 and 85, the dielectric loss (tan $\delta$) quickly becomes worse and the resistivity $\rho$ is smaller than $1\times10^4$ M$\Omega$·cm. Accordingly, the lowest limit of z is 0.002.

On the other hand, a dielectric ceramic composition having desired electric characteristics can be obtained if z is 0.04 as shown in Samples Nos. 83 and 89. However, if z is 0.06 as shown in Samples Nos. 84 and 90, a dense sintered material cannot be obtained, even if the firing temperature is 1250° C. Accordingly, the upper limit of z is 0.04.

Sc, Y, Dy, Ho, Er and Yb of the R component perform almost the same function, so that any one or more than one of them can be used. Tb, Tm and Lu of the R component are not mentioned in (1) to (6) in Table 3. However, they have the same effect as other elements in the R component.

The proper range of k representing the ratio of $\{(Ba_{1-w-x}Ca_wMg_x)O\}$ in the composition formula of the basic component will be described.

A dielectric ceramic composition having desired electric characteristics can be obtained if k is 1.00 as shown in Samples Nos. 92 and 97. However, if k is 0.99 shown in Samples Nos. 91 and 96, the resistivity $\rho$ becomes smaller than $1\times10^6$ M$\Omega$·cm and tan $\delta$ becomes worse. Accordingly, the lowest limit k is 1.00.

On the other hand, a dielectric ceramic composition having desired electric characteristics can be obtained if k is 1.04 as shown in Samples Nos. 94 and 99. However, a dense sintered material cannot be obtained if k is 1.05 as shown in Samples Nos. 95 and 100. Accordingly, the upper limit of k is 1.04.

Next, the proper range of the amount of the additional component will be described.

A dielectric ceramic composition having desired electric characteristics can be obtained if the amount of additional component added is 0.2 parts by weight in 100 parts by weight of the basic component and the mixture is fired at a temperature in the range of 1190° C. to 1200° C. as shown in Samples Nos. 25 and 31. However, a dense sintered material cannot be obtained if the amount of the additional component is 0, even if the firing temperature is 1250° as shown in Samples Nos. 24 and 30. Therefore, the lower limit of the amount of the additional component is 0.2 parts by weight in 100 parts by weight of the basic component.

A dielectric ceramic composition having desired electric characteristics can be obtained if the amount of the additional component added is 5 parts by weight in 100 parts by weight of the basic component as shown in Samples Nos. 28 and 34. However, the dielectric constant $\epsilon_s$ becomes less than 7000 if the amount of the additional component is 7 as shown in Samples Nos. 29 and 35. Therefore, the upper limit of the amount of the additional component is 5 parts by weight.

Next, the desired composition ratio of the additional component will be described.

Figure 2:
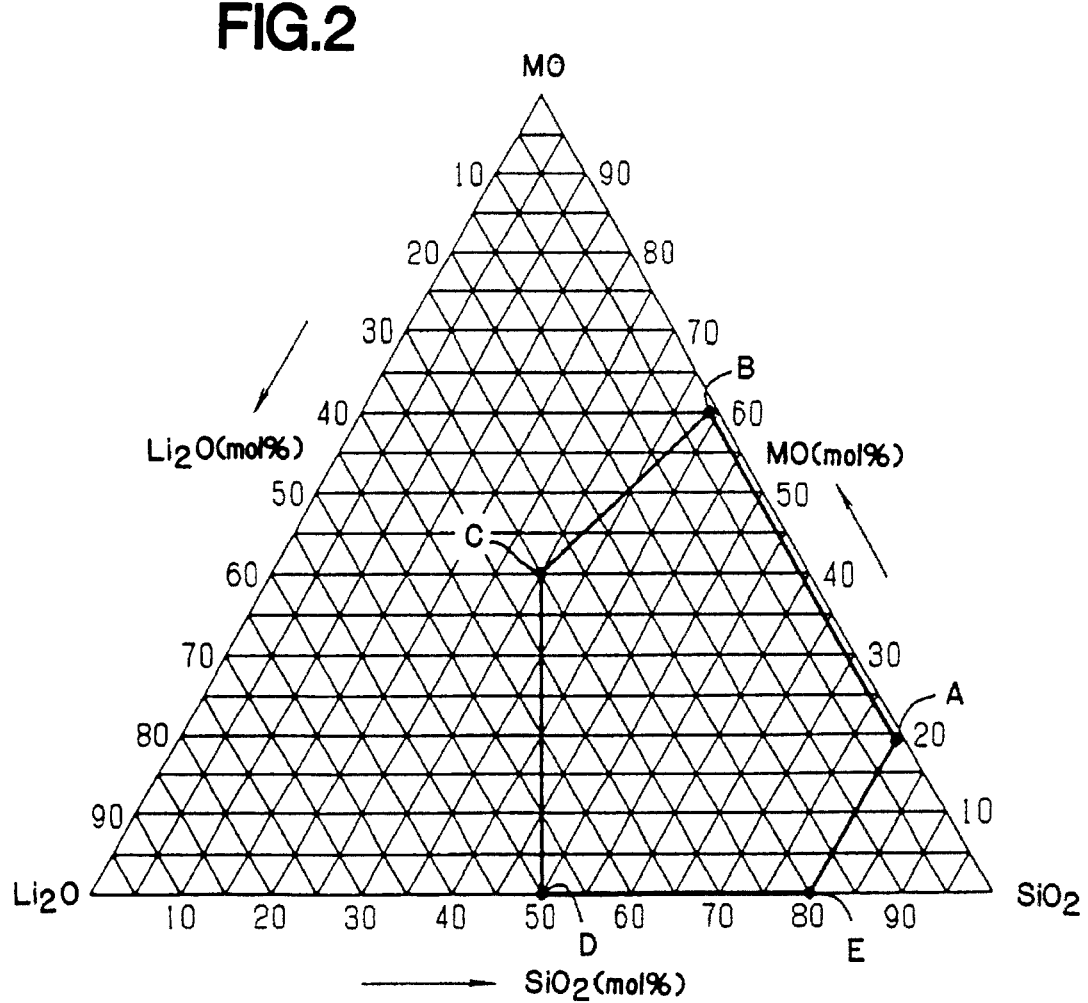
FIG. 2 is a ternary-system diagram showing the composition ratio of the additional component according to the first and fourth preferred embodiments herein.

The desired composition ratio of the additional component can be determined by the ternary system diagram in FIG. 2 showing the ratio of the components of $Li_2O$—$SiO_2$—MO.

In FIG. 2 of the ternary system diagram, the first vertex A represents the composition of the Sample No. 1 in which $Li_2O$ is 1 mol %, $SiO_2$ is 80 mol % and MO is 19%. The second vertex B represents the composition of the Sample No. 2 in which $Li_2O$ is 1 mol %, $SiO_2$ is 39 mol % and MO is 60 mol %. The third vertex C represents the composition of the Sample No. 3 in which $Li_2O$ is 30 mol %, $SiO_2$ is 30 mol % and MO is 40 mol %. The fourth vertex D represents the composition of the Sample No. 4 in which $Li_2O$ is 50 mol %, $SiO_2$ is 50 mol % and MO is 0 mol %. The fifth vertex E represents the composition of the Sample No. 5 in which $Li_2O$ is 20 mol %, $SiO_2$ is 80 mol % and MO is 0 mol %.

The composition ratio in the additional component is preferably within the area proscribed by a polygonal line connecting the first to fifth vertexes of A to E in the ternary system diagram in FIG. 2. A dielectric ceramic composition having desired electric characteristics can be obtained if the composition ratio of the additional component is within the area described above. However, a dense sintered material cannot be obtained if the composition ratio is outside of the range of Samples Nos. 11 to 16.

The MO component may be one of the metal oxides selected from the group consisting of BaO, SrO, CaO, MgO and ZnO. As shown in Samples Nos. 17 to 21, one or more than one of these metal oxides can be blended in the proper ratio as in other samples.

EXAMPLE 2:

The second and fifth preferred embodiments will be described.

First, Sample No. 101 in the Table 6-① and 7-① is prepared.

In this example, the laminated chip is made in the same way as in Example 1 except for the compounds in the additional component, which are shown in Table 5 below.

TABLE 5

| compounds | weight (g) | mol portion |
|---|---|---|
| $B_2O_3$ | 1.03 | 1.0 |
| $SiO_2$ | 70.57 | 80.0 |
| $BaCO_3$ | 11.03 | 3.8 |
| $CaCO_3$ | 13.99 | 9.5 |
| MgO | 3.38 | 5.7 |

The weight (g) of the compounds in Table 5 are calculated in terms of their mol %. It can be seen that $B_2O_3$ is 1 mol %, $SiO_2$ is 80 mol %, and MO is 19 mol % {BaO (3.8 mol %)+CaO (9.5 mol %)+ MgO (5.7 mol %)}. The mol ratio between BaO, CaO and MgO in MO is 20 mol %, 50 mol % and 30 mol %, respectively.

The laminated chip obtained in this example is placed in a furnace and the temperature is increased by 100° C./h to 600° C. in air to oxidize and volatilize the organic binder of the non-sintered ceramic sheet.

The atmosphere of the furnace is then changed from air to a reductive atmosphere of $H_2$ (2 volume %)+$N_2$ (98 volume %). The temperature is then increased by 100° C./h from 600° C. to 1170° C. in the reductive atmosphere, and the highest temperature of 1170° C. is maintained for 3 hours. The temperature is then decreased by 100° C./h to 600° C. and the reductive atmosphere is changed to air (an oxidative atmosphere), and the temperature of 600° C. is maintained for 30 minutes to oxidize the laminated chip. Finally, the temperature is decreased to room temperature, and a laminated fired chip is obtained.

External electrodes are fabricated on the laminated fired chip in the same way as in Example 1 and the measurements of electric characteristics are carried out in the same way as in Example 1. The measurements, as shown in Table 7-①, show a dielectric constant $\epsilon_s$ of 14300, a tan $\delta$ of 1.3%, and a resistivity $\rho$ of 3.99 $\times 10^6$ MΩ·cm.

As for Samples Nos. 102 to No. 196, laminated ceramic capacitors are fabricated by the same method and the electric characteristics are measured under the same condition as Sample No. 101, except that the compositions of the basic component are varied as shown in ① to ⑥ of Table 6. The compositions of the additional component and the temperatures of firing are also varied as shown in ① to ⑥ of Table 7. The temperatures of firing and the electric characteristics of Samples Nos. 101 to 196 are shown in ① to ⑥ of Table 7.

TABLE 6

| | Basic Component | | | | | | | | | | | | | |
|---|---|---|---|---|---|---|---|---|---|---|---|---|---|---|
| | Ba | Ca | Mg | Ti | Zr | | | | z | | | | | |
| Sample No. | 1 − w − x | w | x | 1 − y − z | y | Sc | Y | Gd | Dy | Ho | Er | Yb | total | K |
| 101 | 0.925 | 0.07 | 0.005 | 0.830 | 0.15 | 0.000 | 0.000 | 0.000 | 0.000 | 0.000 | 0,020 | 0.000 | 0.020 | 1.01 |
| 102 | 0.925 | 0.07 | 0.005 | 0.830 | 0.15 | 0.000 | 0.000 | 0,000 | 0.000 | 0.000 | 0.020 | 0.000 | 0.020 | 1.01 |
| 103 | 0.925 | 0.07 | 0.005 | 0.830 | 0.15 | 0.000 | 0.000 | 0.000 | 0,000 | 0.000 | 0.020 | 0.000 | 0.020 | 1.01 |
| 104 | 0.925 | 0.07 | 0.005 | 0.830 | 0.15 | 0.000 | 0.000 | 0.000 | 0.000 | 0.000 | 0.020 | 0.000 | 0.020 | 1.01 |
| 105 | 0.925 | 0.07 | 0.005 | 0.830 | 0.15 | 0.000 | 0.000 | 0.000 | 0.000 | 0.000 | 0.020 | 0.000 | 0.020 | 1.01 |
| 106 | 0.925 | 0.07 | 0.005 | 0.830 | 0.15 | 0.000 | 0.000 | 0.000 | 0.000 | 0.000 | 0.020 | 0.000 | 0.020 | 1.01 |
| 107 | 0.925 | 0.07 | 0.005 | 0.830 | 0.15 | 0.000 | 0.000 | 0.000 | 0.000 | 0.000 | 0.020 | 0.000 | 0.020 | 1.01 |
| 108 | 0.925 | 0.07 | 0.005 | 0.830 | 0.15 | 0.000 | 0.000 | 0.000 | 0.000 | 0.000 | 0.020 | 0.000 | 0.020 | 1.01 |
| 109 | 0.925 | 0.07 | 0.005 | 0.830 | 0.15 | 0.000 | 0.000 | 0.000 | 0.000 | 0.000 | 0.020 | 0.000 | 0.020 | 1.01 |
| 110 | 0.925 | 0.07 | 0.005 | 0.830 | 0.15 | 0.000 | 0.000 | 0.000 | 0.000 | 0.000 | 0.020 | 0.000 | 0.020 | 1.01 |
| *111 | 0.925 | 0.07 | 0.005 | 0.830 | 0.15 | 0.000 | 0.000 | 0.000 | 0.000 | 0.000 | 0.020 | 0.000 | 0.020 | 1.01 |
| *112 | 0.925 | 0.07 | 0.005 | 0.830 | 0.15 | 0.000 | 0.000 | 0.000 | 0.000 | 0.000 | 0.020 | 0.000 | 0.020 | 1.01 |
| *113 | 0.925 | 0.07 | 0.005 | 0.830 | 0.15 | 0.000 | 0.000 | 0.000 | 0.000 | 0.000 | 0.020 | 0.000 | 0.020 | 1.01 |
| 114 | 0.925 | 0.07 | 0.005 | 3.830 | 0.15 | 0.000 | 0.000 | 0.000 | 0.000 | 0.000 | 0.020 | 0.000 | 0.020 | 1.01 |

TABLE 6-continued

| | Basic Component | | | | | | | | | | | | | |
|---|---|---|---|---|---|---|---|---|---|---|---|---|---|---|
| | Ba | Ca | Mg | Ti | Zr | z | | | | | | | | |
| Sample No. | $1-w-x$ | w | x | $1-y-z$ | y | Sc | Y | Gd | Dy | Ho | Er | Yb | total | K |
| 115 | 0.925 | 0.07 | 0.005 | 0.830 | 0.15 | 0.000 | 0.000 | 0.000 | 0.000 | 0.000 | 0.020 | 0.000 | 0.020 | 1.01 |
| 116 | 0.925 | 0.07 | 0.005 | 0.830 | 0.15 | 0.000 | 0.000 | 0.000 | 0.000 | 0.000 | 0.020 | 0.000 | 0.020 | 1.01 |
| 117 | 0.925 | 0.07 | 0.005 | 0.830 | 0.15 | 0.000 | 0.000 | 0.000 | 0.000 | 0.000 | 0.020 | 0.000 | 0.020 | 1.01 |
| 118 | 0.925 | 0.07 | 0.005 | 0.830 | 0.15 | 0.000 | 0.000 | 0.000 | 0.000 | 0.000 | 0.020 | 0.000 | 0.020 | 1.01 |
| 119 | 0.925 | 0.07 | 0.005 | 0.830 | 0.15 | 0.000 | 0.000 | 0.000 | 0.000 | 0.000 | 0.020 | 0.000 | 0.020 | 1.01 |
| *120 | 0.925 | 0.07 | 0.005 | 0.830 | 0.15 | 0.000 | 0.000 | 0.000 | 0.000 | 0.000 | 0.020 | 0.000 | 0.020 | 1.01 |
| 121 | 0.925 | 0.07 | 0.005 | 0.830 | 0.15 | 0.000 | 0.000 | 0.000 | 0.000 | 0.000 | 0.020 | 0.000 | 0.020 | 1.01 |
| 122 | 0.925 | 0.07 | 0.005 | 0.830 | 0.15 | 0.000 | 0.000 | 0.000 | 0.000 | 0.000 | 0.020 | 0.000 | 0.020 | 1.01 |
| 123 | 0.925 | 0.07 | 0.005 | 0.830 | 0.15 | 0.000 | 0.000 | 0.000 | 0.000 | 0.000 | 0.020 | 0.000 | 0.020 | 1.01 |
| 124 | 0.925 | 0.07 | 0.005 | 0.830 | 0.15 | 0.000 | 0.000 | 0.000 | 0.000 | 0.000 | 0.020 | 0.000 | 0.020 | 1.01 |
| *125 | 0.925 | 0.07 | 0.005 | 0.830 | 0.15 | 0.000 | 0.000 | 0.000 | 0.000 | 0.000 | 0.020 | 0.000 | 0.020 | 1.01 |
| *126 | 0.795 | 0.20 | 0.005 | 0.810 | 0.18 | 0.000 | 0.010 | 0.000 | 0.000 | 0.000 | 0.000 | 0.000 | 0.010 | 1.03 |
| 127 | 0.795 | 0.20 | 0.005 | 0.810 | 0.18 | 0.000 | 0.010 | 0.000 | 0.000 | 0.000 | 0.000 | 0.000 | 0.010 | 1.03 |
| 128 | 0.795 | 0.20 | 0.005 | 0.810 | 0.18 | 0.000 | 0.010 | 0.000 | 0.000 | 0.000 | 0.000 | 0.000 | 0.010 | 1.03 |
| 129 | 0.795 | 0.20 | 0.005 | 0.810 | 0.18 | 0.000 | 0.010 | 0.000 | 0.000 | 0.000 | 0.000 | 0.000 | 0.010 | 1.03 |
| 130 | 0.795 | 0.20 | 0.005 | 0.810 | 0.18 | 0.000 | 0.010 | 0.000 | 0.000 | 0.000 | 0.000 | 0.000 | 0.010 | 1.03 |
| *131 | 0.795 | 0.20 | 0.005 | 0.810 | 0.18 | 0.000 | 0.010 | 0.000 | 0.000 | 0.000 | 0.000 | 0.000 | 0.010 | 1.03 |
| 132 | 0.990 | 0.00 | 0.010 | 0.850 | 0.13 | 0.000 | 0.000 | 0.000 | 0.000 | 0.020 | 0.000 | 0.000 | 0.020 | 1.02 |
| 133 | 0.970 | 0.02 | 0.010 | 0.850 | 0.13 | 0.000 | 0.000 | 0.000 | 0.000 | 0.020 | 0.000 | 0.000 | 0.020 | 1.02 |
| 134 | 0.890 | 0.10 | 0.010 | 0.850 | 0.13 | 0.000 | 0.000 | 0.000 | 0.000 | 0.020 | 0.000 | 0.000 | 0.020 | 1.02 |
| 135 | 0.790 | 0.20 | 0.010 | 0.850 | 0.13 | 0.000 | 0.000 | 0.000 | 0.000 | 0.020 | 0.000 | 0.000 | 0.020 | 1.02 |
| 136 | 0.720 | 0.27 | 0.010 | 0.850 | 0.13 | 0.000 | 0.000 | 0.000 | 0.000 | 0.020 | 0.000 | 0.000 | 0.020 | 1.02 |
| *137 | 0.690 | 0.30 | 0.010 | 0.850 | 0.13 | 0.000 | 0.000 | 0.000 | 0.000 | 0.020 | 0.000 | 0.000 | 0.020 | 1.02 |
| 138 | 0.995 | 0.00 | 0.005 | 0.790 | 0.20 | 0.000 | 0.000 | 0.000 | 0.010 | 0.000 | 0.000 | 0.000 | 0.010 | 1.00 |
| 139 | 0.975 | 0.02 | 0.005 | 0.790 | 0.20 | 0.000 | 0.000 | 0.000 | 0.010 | 0.000 | 0.000 | 0.000 | 0.010 | 1.00 |
| 140 | 0.895 | 0.10 | 0.005 | 0.790 | 0.20 | 0.000 | 0.000 | 0.000 | 0.010 | 0.000 | 0.000 | 0.000 | 0.010 | 1.00 |
| 141 | 0.795 | 0.20 | 0.005 | 0.790 | 0.20 | 0.000 | 0.000 | 0.000 | 0.010 | 0.000 | 0.000 | 0.000 | 0.010 | 1.00 |
| 142 | 0.725 | 0.27 | 0.005 | 0.790 | 0.20 | 0.000 | 0.000 | 0.000 | 0.010 | 0.000 | 0.000 | 0.000 | 0.010 | 1.00 |
| *143 | 0.695 | 0.30 | 0.005 | 0.790 | 0.20 | 0.000 | 0.000 | 0.000 | 0.010 | 0.000 | 0.000 | 0.000 | 0.010 | 1.00 |
| 144 | 0.949 | 0.05 | 0.001 | 0.870 | 0.10 | 0.000 | 0.000 | 0.000 | 0.000 | 0.030 | 0.000 | 0.000 | 0.030 | 1.01 |
| 145 | 0.945 | 0.05 | 0.005 | 0.870 | 0.10 | 0.000 | 0.000 | 0.000 | 0.000 | 0.030 | 0.000 | 0.000 | 0.030 | 1.01 |
| 146 | 0.940 | 0.05 | 0.010 | 0.870 | 0.10 | 0.000 | 0.000 | 0.000 | 0.000 | 0.030 | 0.000 | 0.000 | 0.030 | 1.01 |
| 147 | 0.930 | 0.05 | 0.020 | 0.870 | 0.10 | 0.000 | 0.000 | 0.000 | 0.000 | 0.030 | 0.000 | 0.000 | 0.030 | 1.01 |
| 148 | 0.920 | 0.05 | 0.030 | 0.870 | 0.10 | 0.000 | 0.000 | 0.000 | 0.000 | 0.030 | 0.000 | 0.000 | 0.030 | 1.01 |
| *149 | 0.910 | 0.05 | 0.040 | 0.870 | 0.10 | 0.000 | 0.000 | 0.000 | 0.000 | 0.030 | 0.000 | 0.000 | 0.030 | 1.01 |
| 150 | 0.869 | 0.13 | 0.001 | 0.815 | 0.18 | 0.000 | 0.000 | 0.000 | 0.000 | 0.000 | 0.000 | 0.005 | 0.005 | 1.01 |
| 151 | 0.865 | 0.13 | 0.005 | 0.815 | 0.18 | 0.000 | 0.000 | 0.000 | 0.000 | 0.000 | 0.000 | 0.005 | 0.005 | 1.01 |
| 152 | 0.860 | 0.13 | 0.010 | 0.815 | 0.18 | 0.000 | 0.000 | 0.000 | 0.000 | 0.000 | 0.000 | 0.005 | 0.005 | 1.01 |
| 153 | 0.850 | 0.13 | 0.020 | 0.815 | 0.18 | 0.000 | 0.000 | 0.000 | 0.000 | 0.000 | 0.000 | 0.005 | 0.005 | 1.01 |
| 154 | 0.840 | 0.13 | 0.030 | 0.815 | 0.18 | 0.000 | 0.000 | 0.000 | 0.000 | 0.000 | 0.000 | 0.005 | 0.005 | 1.01 |
| *155 | 0.830 | 0.13 | 0.040 | 0.815 | 0.18 | 0.000 | 0.000 | 0.000 | 0.000 | 0.000 | 0.000 | 0.005 | 0.005 | 1.01 |
| *156 | 0.940 | 0.05 | 0.010 | 0.950 | 0.03 | 0.000 | 0.000 | 0.020 | 0.000 | 0.000 | 0.000 | 0.000 | 0.020 | 1.01 |
| 157 | 0.940 | 0.05 | 0.010 | 0.930 | 0.05 | 0.000 | 0.000 | 0.020 | 0.000 | 0.000 | 0.000 | 0.000 | 0.020 | 1.01 |
| 158 | 0.940 | 0.05 | 0.010 | 0.830 | 0.15 | 0.000 | 0.000 | 0.020 | 0.000 | 0.000 | 0.000 | 0.000 | 0.020 | 1.01 |
| 159 | 0.940 | 0.05 | 0.010 | 0.720 | 0.26 | 0.000 | 0.000 | 0.020 | 0.000 | 0.000 | 0.000 | 0.000 | 0.020 | 1.01 |
| *160 | 0.940 | 0.05 | 0.010 | 0.690 | 0.29 | 0.000 | 0.000 | 0.020 | 0.000 | 0.000 | 0.000 | 0.000 | 0.020 | 1.01 |
| *161 | 0.845 | 0.15 | 0.005 | 0.930 | 0.03 | 0.000 | 0.040 | 0.000 | 0.000 | 0.000 | 0.000 | 0.000 | 0.040 | 1.03 |
| 162 | 0.845 | 0.15 | 0.005 | 0.910 | 0.05 | 0.000 | 0.040 | 0.000 | 0.000 | 0.000 | 0.000 | 0.000 | 0.040 | 1.03 |
| 163 | 0.845 | 0.15 | 0.005 | 0.810 | 0.15 | 0.000 | 0.040 | 0.000 | 0.000 | 0.000 | 0.000 | 0.000 | 0.040 | 1.03 |
| 164 | 0.845 | 0.35 | 0.005 | 0.700 | 0.26 | 0.000 | 0.040 | 0.000 | 0.000 | 0.000 | 0.000 | 0.000 | 0.040 | 1.03 |
| *165 | 0.845 | 0.15 | 0.005 | 0.670 | 0.29 | 0.000 | 0.040 | 0.000 | 0.000 | 0.000 | 0.000 | 0.000 | 0.040 | 1.03 |
| 166 | 0.920 | 0.07 | 0.010 | 0.870 | 0.12 | 0.010 | 0.000 | 0.000 | 0.000 | 0.000 | 0.000 | 0.000 | 0.010 | 1.02 |
| 167 | 0.920 | 0.07 | 0.010 | 0.870 | 0.12 | 0.000 | 0.010 | 0.000 | 0.000 | 0.000 | 0.000 | 0.000 | 0.010 | 1.02 |
| 168 | 0.920 | 0.07 | 0.010 | 0.870 | 0.12 | 0.000 | 0.000 | 0.010 | 0.000 | 0.000 | 0.000 | 0.000 | 0.010 | 1.02 |
| 169 | 0.920 | 0.07 | 0.010 | 0.870 | 0.12 | 0.000 | 0.000 | 0.000 | 0 010 | 0.000 | 0.000 | 0.000 | 0.010 | 1.02 |
| 170 | 0.920 | 0.07 | 0.010 | 0.870 | 0.12 | 0.000 | 0.000 | 0.000 | 0.000 | 0.010 | 0.000 | 0.000 | 0.010 | 1.02 |
| 171 | 0.920 | 0.07 | 0.010 | 0.870 | 0.12 | 0.000 | 0.000 | 0.000 | 0.000 | 0.000 | 0.010 | 0.000 | 0.010 | 1.02 |
| 172 | 0.920 | 0.07 | 0.010 | 0.870 | 0.12 | 0.000 | 0.000 | 0.000 | 0.000 | 0.000 | 0.000 | 0.010 | 0.010 | 1.02 |
| 173 | 0.920 | 0.07 | 0.010 | 0.870 | 0.12 | 0.000 | 0.005 | 0.000 | 0.005 | 0.000 | 0.000 | 0.000 | 0.010 | 1.02 |
| 174 | 0.920 | 0.07 | 0.010 | 0.870 | 0.12 | 0.000 | 0.000 | 0.002 | 0.000 | 0.004 | 0.000 | 0.004 | 0.010 | 1.02 |
| *175 | 0.848 | 0.15 | 0.002 | 0.929 | 0.07 | 0.000 | 0.000 | 0.000 | 0.000 | 0.000 | 0.000 | 0.001 | 0.001 | 1.01 |
| 176 | 0.848 | 0.15 | 0.002 | 0.928 | 0.07 | 0.000 | 0.000 | 0.000 | 0.000 | 0.000 | 0.000 | 0.002 | 0.002 | 1.01 |
| 177 | 0.848 | 0.15 | 0.002 | 0.925 | 0.07 | 0.000 | 0.000 | 0.000 | 0.000 | 0.000 | 0.000 | 0.005 | 0.005 | 1.01 |
| 178 | 0.848 | 0.15 | 0.002 | 0.910 | 0.07 | 0.000 | 0.000 | 0.000 | 0.000 | 0.000 | 0.000 | 0.020 | 0.020 | 1.01 |
| 179 | 0.848 | 0.15 | 0.002 | 0.890 | 0.07 | 0.000 | 0.000 | 0.000 | 0.000 | 0.000 | 0.000 | 0.040 | 0.040 | 1.01 |
| *180 | 0.848 | 0.15 | 0.002 | 0.870 | 0.07 | 0.000 | 0.000 | 0.000 | 0.000 | 0.000 | 0.000 | 0.060 | 0.060 | 1.01 |
| *181 | 0.950 | 0.03 | 0.020 | 0.869 | 0.13 | 0.000 | 0.000 | 0.000 | 0.001 | 0.000 | 0.000 | 0.000 | 0.001 | 1.02 |
| 182 | 0.950 | 0.03 | 0.020 | 0.868 | 0.13 | 0.000 | 0.000 | 0.000 | 0.002 | 0.000 | 0.000 | 0.000 | 0.002 | 1.02 |
| 183 | 0.950 | 0.03 | 0.020 | 0.865 | 0.13 | 0.000 | 0.000 | 0.000 | 0.005 | 0.000 | 0.000 | 0.000 | 0.005 | 1.02 |
| 184 | 0.950 | 0.03 | 0.020 | 0.850 | 0.13 | 0.000 | 0.000 | 0.000 | 0.020 | 0.000 | 0.000 | 0.000 | 0.020 | 1.02 |
| 185 | 0.950 | 0.03 | 0.020 | 0.830 | 0.13 | 0.000 | 0.000 | 0.000 | 0.040 | 0.000 | 0.000 | 0.000 | 0.040 | 1.02 |
| *186 | 0.950 | 0.03 | 0.020 | 0.810 | 0.13 | 0.000 | 0.000 | 0.000 | 0.060 | 0.000 | 0.000 | 0.000 | 0.060 | 1.02 |
| *187 | 0.940 | 0.05 | 0.010 | 0.810 | 0.18 | 0.000 | 0.010 | 0.000 | 0.000 | 0.000 | 0.000 | 0.000 | 0.010 | 0.99 |

TABLE 6-continued

| | Basic Component | | | | | | | | | | | | | |
|---|---|---|---|---|---|---|---|---|---|---|---|---|---|---|
| | Ba | Ca | Mg | Ti | Zr | | | | z | | | | | |
| Sample No. | 1 − w − x | w | x | 1 − y − z | y | Sc | Y | Gd | Dy | Ho | Er | Yb | total | K |
| 188 | 0.940 | 0.05 | 0.010 | 0.810 | 0.18 | 0.000 | 0.010 | 0.000 | 0.000 | 0.000 | 0.000 | 0.000 | 0.010 | 1.00 |
| 189 | 0.940 | 0.05 | 0.010 | 0.810 | 0.18 | 0.000 | 0.010 | 0.000 | 0.000 | 0.000 | 0.000 | 0.000 | 0.010 | 1.02 |
| 190 | 0.940 | 0.05 | 0.010 | 0.810 | 0.18 | 0.000 | 0.010 | 0.000 | 0.000 | 0.000 | 0.000 | 0.000 | 0.010 | 1.04 |
| *191 | 0.940 | 0.05 | 0.010 | 0.810 | 0.18 | 0.000 | 0.010 | 0.000 | 0.000 | 0.000 | 0.000 | 0.000 | 0.010 | 1.05 |
| *192 | 0.895 | 0.10 | 0.005 | 0.795 | 0.20 | 0.000 | 0.000 | 0.000 | 0.000 | 0.005 | 0.000 | 0.000 | 0.005 | 0.99 |
| 193 | 0.895 | 0.10 | 0.005 | 0.795 | 0.20 | 0.000 | 0.000 | 0.000 | 0.000 | 0.005 | 0.000 | 0.000 | 0.005 | 1.00 |
| 194 | 0.895 | 0.10 | 0.005 | 0.795 | 0.20 | 0.000 | 0.000 | 0.000 | 0.000 | 0.005 | 0.000 | 0.000 | 0.005 | 1.02 |
| 195 | 0.895 | 0.10 | 0.005 | 0.795 | 0.20 | 0.000 | 0.000 | 0.000 | 0.000 | 0.005 | 0.000 | 0.000 | 0.005 | 1.04 |
| *196 | 0.895 | 0.10 | 0.005 | 0.795 | 0.20 | 0.000 | 0.000 | 0.000 | 0.000 | 0.005 | 0.000 | 0.000 | 0.005 | 1.05 |

*marks show compared samples

TABLE 7

| | Additional Component | | | | | | | | | Characteristics | | | |
|---|---|---|---|---|---|---|---|---|---|---|---|---|---|
| | Amount weight | Composition (mol %) | | | Content of MO (mol %) | | | | | Temp. of firing | Dielectric constant | tan δ | Resistivity ρ |
| Sample No. | portions | $B_2O_3$ | $SiO_2$ | MO | BaO | SrO | CaO | MgO | ZnO | (°C.) | ε | (%) | (MΩ · cm) |
| 101 | 2.0 | 1 | 80 | 19 | 20 | 0 | 50 | 30 | 0 | 1170 | 14300 | 1.3 | $3.99 \times 10^6$ |
| 102 | 2.0 | 1 | 39 | 60 | 20 | 0 | 50 | 30 | 0 | 1170 | 14800 | 1.2 | $3.56 \times 10^6$ |
| 103 | 2.0 | 30 | 0 | 70 | 20 | 0 | 50 | 30 | 0 | 1150 | 14600 | 1.3 | $3.53 \times 10^6$ |
| 104 | 2.0 | 90 | 0 | 10 | 20 | 0 | 50 | 30 | 0 | 1150 | 14800 | 1.4 | $3.18 \times 10^6$ |
| 105 | 2.0 | 90 | 10 | 0 | 0 | 0 | 0 | 0 | 0 | 1150 | 15300 | 1.5 | $3.19 \times 10^6$ |
| 106 | 2.0 | 20 | 80 | 0 | 0 | 0 | 0 | 0 | 0 | 1150 | 15000 | 1.3 | $3.54 \times 10^6$ |
| 107 | 2.0 | 15 | 30 | 55 | 20 | 0 | 50 | 30 | 0 | 1150 | 15000 | 1.2 | $3.03 \times 10^6$ |
| 108 | 2.0 | 45 | 15 | 40 | 20 | 0 | 50 | 30 | 0 | 1150 | 14800 | 1.3 | $3.73 \times 10^6$ |
| 109 | 2.0 | 20 | 50 | 30 | 20 | 0 | 50 | 30 | 0 | 1150 | 15500 | 1.5 | $3.16 \times 10^6$ |
| 110 | 2.0 | 50 | 30 | 20 | 20 | 0 | 50 | 30 | 0 | 1160 | 15100 | 1.2 | $3.84 \times 10^6$ |
| *111 | 2.0 | 10 | 20 | 70 | 20 | 0 | 50 | 30 | 0 | 1250 | Not coherently sintered on firing | | |
| *112 | 2.0 | 95 | 5 | 0 | 0 | 0 | 0 | 0 | 0 | 1250 | Not coherently sintered on firing | | |
| *113 | 2.0 | 10 | 85 | 5 | 20 | 0 | 50 | 30 | 0 | 1250 | Not coherently sintered on firing | | |
| 114 | 2.0 | 20 | 50 | 30 | 100 | 0 | 0 | 0 | 0 | 1150 | 14600 | 1.3 | $3.78 \times 10^6$ |
| 115 | 2.0 | 20 | 50 | 30 | 0 | 100 | 0 | 0 | 0 | 1150 | 15200 | 1.4 | $3.13 \times 10^6$ |
| 116 | 2.0 | 20 | 50 | 30 | 0 | 0 | 100 | 0 | 0 | 1150 | 15100 | 1.2 | $3.55 \times 10^6$ |
| 117 | 2.0 | 20 | 50 | 30 | 0 | 0 | 0 | 100 | 0 | 1150 | 14200 | 1.2 | $4.00 \times 10^6$ |
| 118 | 2.0 | 20 | 50 | 30 | 0 | 0 | 0 | 0 | 100 | 1150 | 14400 | 1.2 | $3.79 \times 10^6$ |
| 119 | 2.0 | 20 | 50 | 30 | 20 | 20 | 20 | 20 | 20 | 1150 | 14900 | 1.2 | $3.81 \times 10^6$ |
| *120 | 0.0 | 0 | 0 | 0 | 0 | 0 | 0 | 0 | 0 | 1250 | Not coherently sintered on firing | | |
| 121 | 0.2 | 15 | 75 | 10 | 30 | 10 | 10 | 30 | 20 | 1190 | 18800 | 2.1 | $2.53 \times 10^6$ |
| 122 | 1.0 | 15 | 75 | 10 | 30 | 10 | 10 | 30 | 20 | 1180 | 17700 | 1.7 | $3.27 \times 10^6$ |
| 123 | 3.0 | 15 | 75 | 10 | 30 | 10 | 10 | 30 | 20 | 1150 | 13400 | 1.2 | $3.64 \times 10^6$ |
| 124 | 5.0 | 15 | 75 | 10 | 30 | 10 | 10 | 30 | 20 | 1100 | 9500 | 0.8 | $5.69 \times 10^6$ |
| *125 | 7.0 | 15 | 75 | 10 | 30 | 10 | 10 | 30 | 20 | 1080 | 5300 | 0.6 | $1.08 \times 10^7$ |
| *126 | 0.0 | 0 | 0 | 0 | 0 | 0 | 0 | 0 | 0 | 1250 | Not coherently sintered on firing | | |
| 127 | 0.2 | 45 | 15 | 40 | 0 | 50 | 50 | 0 | 0 | 1200 | 10100 | 1.1 | $4.95 \times 10^6$ |
| 128 | 1.0 | 45 | 15 | 40 | 0 | 50 | 50 | 0 | 0 | 1170 | 9600 | 0.9 | $5.12 \times 10^6$ |
| 129 | 3.0 | 45 | 15 | 40 | 0 | 50 | 50 | 0 | 0 | 1140 | 8800 | 0.7 | $6.61 \times 10^6$ |
| 130 | 5.0 | 45 | 15 | 40 | 0 | 50 | 50 | 0 | 0 | 1110 | 7200 | 0.7 | $7.28 \times 10^6$ |
| *131 | 7.0 | 45 | 15 | 40 | 0 | 50 | 50 | 0 | 0 | 1080 | 5500 | 0.6 | $9.23 \times 10^6$ |
| 132 | 2.0 | 60 | 0 | 40 | 20 | 20 | 20 | 20 | 20 | 1150 | 16000 | 1.6 | $3.40 \times 10^6$ |
| 133 | 2.0 | 60 | 0 | 40 | 20 | 20 | 20 | 20 | 20 | 1170 | 15400 | 1.5 | $3.54 \times 10^6$ |
| 134 | 2.0 | 60 | 0 | 40 | 20 | 20 | 20 | 20 | 20 | 1170 | 12700 | 1.1 | $4.55 \times 10^6$ |
| 135 | 2.0 | 60 | 0 | 40 | 20 | 20 | 20 | 20 | 20 | 1170 | 11200 | 1.0 | $4.91 \times 10^6$ |
| 136 | 2.0 | 60 | 0 | 40 | 20 | 20 | 20 | 20 | 20 | 1200 | 7700 | 0.8 | $5.92 \times 10^6$ |
| *137 | 2.0 | 60 | 0 | 40 | 20 | 20 | 20 | 20 | 20 | 1250 | 5500 | 0.5 | $1.03 \times 10^7$ |
| 138 | 3.0 | 50 | 45 | 5 | 0 | 100 | 0 | 0 | 0 | 1140 | 12800 | 1.3 | $4.48 \times 10^6$ |
| 139 | 3.0 | 50 | 45 | 5 | 0 | 100 | 0 | 0 | 0 | 1140 | 11600 | 1.1 | $4.86 \times 10^6$ |
| 140 | 3.0 | 50 | 45 | 5 | 0 | 100 | 0 | 0 | 0 | 1140 | 10400 | 0.8 | $4.90 \times 10^6$ |
| 141 | 3.0 | 50 | 45 | 5 | 0 | 100 | 0 | 0 | 0 | 1180 | 8700 | 0.6 | $5.32 \times 10^6$ |
| 142 | 3.0 | 50 | 45 | 5 | 0 | 100 | 0 | 0 | 0 | 1200 | 7300 | 0.6 | $7.38 \times 10^6$ |
| *143 | 3.0 | 50 | 45 | 5 | 0 | 100 | 0 | 0 | 0 | 1250 | 5300 | 0.5 | $1.03 \times 10^7$ |
| 144 | 0.5 | 45 | 15 | 40 | 20 | 0 | 50 | 30 | 0 | 1160 | 15400 | 1.4 | $3.61 \times 10^6$ |
| 145 | 0.5 | 45 | 15 | 40 | 20 | 0 | 50 | 30 | 0 | 1160 | 15500 | 1.4 | $3.56 \times 10^6$ |
| 146 | 0.5 | 45 | 15 | 40 | 20 | 0 | 50 | 30 | 0 | 1160 | 13800 | 1.3 | $3.59 \times 10^6$ |
| 147 | 0.5 | 45 | 15 | 40 | 20 | 0 | 50 | 30 | 0 | 1180 | 12300 | 1.2 | $4.54 \times 10^6$ |
| 148 | 0.5 | 45 | 15 | 40 | 20 | 0 | 50 | 30 | 0 | 1180 | 10500 | 1.0 | $4.39 \times 10^6$ |

TABLE 7-continued

| | Additional Component | | | | | | | | | Characteristics | | | |
|---|---|---|---|---|---|---|---|---|---|---|---|---|---|
| | Amount weight | Composition (mol %) | | | Content of MO (mol %) | | | | | Temp. of firing | Dielectric constant | tan δ | Resistivity ρ |
| Sample No. | portions | $B_2O_3$ | $SiO_2$ | MO | BaO | SrO | CaO | MgO | ZnO | (°C.) | ε | (%) | (MΩ · cm) |
| *149 | 0.5 | 45 | 15 | 40 | 20 | 0 | 50 | 30 | 0 | 1200 | 3400 | 1.4 | $1.71 \times 10^6$ |
| 150 | 1.0 | 5 | 55 | 40 | 20 | 0 | 50 | 30 | 0 | 1150 | 13500 | 1.2 | $3.71 \times 10^6$ |
| 151 | 1.0 | 5 | 55 | 40 | 20 | 0 | 50 | 30 | 0 | 1150 | 14100 | 1.3 | $3.73 \times 10^6$ |
| 152 | 1.0 | 5 | 55 | 40 | 20 | 0 | 50 | 30 | 0 | 1150 | 11200 | 1.2 | $4.65 \times 10^6$ |
| 153 | 1.0 | 5 | 55 | 40 | 20 | 0 | 50 | 30 | 0 | 1180 | 9500 | 0.8 | $6.02 \times 10^6$ |
| 154 | 1.0 | 5 | 55 | 40 | 20 | 0 | 50 | 30 | 0 | 1180 | 7700 | 0.7 | $6.66 \times 10^6$ |
| *155 | 1.0 | 5 | 55 | 40 | 20 | 0 | 50 | 30 | 0 | 1200 | 2800 | 1.2 | $1.70 \times 10^7$ |
| *156 | 1.0 | 5 | 55 | 40 | 0 | 0 | 0 | 100 | 0 | 1180 | 5700 | 2.2 | $9.10 \times 10^6$ |
| 157 | 1.0 | 5 | 55 | 40 | 0 | 0 | 0 | 100 | 0 | 1180 | 9800 | 1.8 | $5.27 \times 10^6$ |
| 158 | 1.0 | 5 | 55 | 40 | 0 | 0 | 0 | 100 | 0 | 1180 | 17700 | 1.4 | $2.83 \times 10^6$ |
| 159 | 1.0 | 5 | 55 | 40 | 0 | 0 | 0 | 100 | 0 | 1180 | 12200 | 0.9 | $4.22 \times 10^6$ |
| *160 | 1.0 | 5 | 55 | 40 | 0 | 0 | 0 | 100 | 0 | 1180 | 5600 | 0.6 | $9.75 \times 10^6$ |
| *161 | 3.0 | 20 | 50 | 30 | 100 | 0 | 0 | 0 | 0 | 1160 | 5200 | 1.8 | $1.09 \times 10^7$ |
| 162 | 3.0 | 20 | 50 | 30 | 100 | 0 | 0 | 0 | 0 | 1160 | 7900 | 2.1 | $5.82 \times 10^6$ |
| 163 | 3.0 | 20 | 50 | 30 | 100 | 0 | 0 | 0 | 0 | 1160 | 12200 | 1.7 | $4.67 \times 10^6$ |
| 164 | 3.0 | 20 | 50 | 30 | 100 | 0 | 0 | 0 | 0 | 1160 | 8500 | 0.7 | $6.79 \times 10^6$ |
| *165 | 3.0 | 20 | 50 | 30 | 100 | 0 | 0 | 0 | 0 | 1160 | 5200 | 0.4 | $1.02 \times 10^6$ |
| 166 | 0.5 | 45 | 15 | 40 | 20 | 20 | 20 | 20 | 20 | 1170 | 13800 | 1.2 | $4.01 \times 10^6$ |
| 167 | 0.5 | 45 | 15 | 40 | 20 | 20 | 20 | 20 | 20 | 1170 | 14100 | 1.3 | $3.28 \times 10^6$ |
| 168 | 0.5 | 45 | 15 | 40 | 20 | 20 | 20 | 20 | 20 | 1170 | 13400 | 1.0 | $3.79 \times 10^6$ |
| 169 | 0.5 | 45 | 15 | 40 | 20 | 20 | 20 | 20 | 20 | 1170 | 13700 | 1.1 | $3.51 \times 10^6$ |
| 170 | 0.5 | 45 | 15 | 40 | 20 | 20 | 20 | 20 | 20 | 1170 | 13400 | 1.0 | $4.18 \times 10^6$ |
| 171 | 0.5 | 45 | 15 | 40 | 20 | 20 | 20 | 20 | 20 | 1170 | 13600 | 1.0 | $4.20 \times 10^6$ |
| 172 | 0.5 | 45 | 15 | 40 | 20 | 20 | 20 | 20 | 20 | 1170 | 13200 | 1.0 | $4.14 \times 10^6$ |
| 173 | 0.5 | 45 | 15 | 40 | 20 | 20 | 20 | 20 | 20 | 1170 | 14100 | 1.2 | $4.05 \times 10^6$ |
| 174 | 0.5 | 45 | 15 | 40 | 20 | 20 | 20 | 20 | 20 | 1170 | 13400 | 1.0 | $4.04 \times 10^6$ |
| *175 | 2.0 | 50 | 30 | 20 | 0 | 0 | 100 | 0 | 0 | 1150 | 6800 | 12.4 | $3.12 \times 10^2$ |
| 176 | 2.0 | 50 | 30 | 20 | 0 | 0 | 100 | 0 | 0 | 1150 | 7300 | 1.4 | $7.71 \times 10^6$ |
| 177 | 2.0 | 50 | 30 | 20 | 0 | 0 | 100 | 0 | 0 | 1150 | 8100 | 1.3 | $6.10 \times 10^6$ |
| 178 | 2.0 | 50 | 30 | 20 | 0 | 0 | 100 | 0 | 0 | 1150 | 11700 | 1.6 | $3.92 \times 10^6$ |
| 179 | 2.0 | 50 | 30 | 20 | 0 | 0 | 100 | 0 | 0 | 1180 | 15200 | 2.0 | $3.25 \times 10^6$ |
| *180 | 2.0 | 50 | 30 | 20 | 0 | 0 | 100 | 0 | 0 | 1250 | Not coherently sintered on firing | | |
| *181 | 4.0 | 15 | 30 | 55 | 0 | 50 | 50 | 0 | 0 | 1150 | 8200 | 7.3 | $5.57 \times 10^3$ |
| 182 | 4.0 | 15 | 30 | 55 | 0 | 50 | 50 | 0 | 0 | 1150 | 9300 | 1.3 | $5.27 \times 10^6$ |
| 183 | 4.0 | 15 | 30 | 55 | 0 | 50 | 50 | 0 | 0 | 1150 | 9900 | 1.1 | $5.76 \times 10^6$ |
| 184 | 4.0 | 15 | 30 | 55 | 0 | 50 | 50 | 0 | 0 | 1180 | 10300 | 1.1 | $4.96 \times 10^6$ |
| 185 | 4.0 | 15 | 30 | 55 | 0 | 50 | 50 | 0 | 0 | 1180 | 8300 | 0.8 | $6.69 \times 10^6$ |
| *186 | 4.0 | 15 | 30 | 55 | 0 | 50 | 50 | 0 | 0 | 1250 | Not coherently sintered on firing | | |
| *187 | 1.0 | 20 | 50 | 30 | 20 | 0 | 50 | 30 | 0 | 1160 | 18200 | 5.7 | $3.95 \times 10^4$ |
| 188 | 1.0 | 20 | 50 | 30 | 20 | 0 | 50 | 30 | 0 | 1160 | 17000 | 1.6 | $3.26 \times 10^6$ |
| 189 | 1.0 | 20 | 50 | 30 | 20 | 0 | 50 | 30 | 0 | 1160 | 16700 | 1.4 | $3.02 \times 10^6$ |
| 190 | 1.0 | 20 | 50 | 30 | 20 | 0 | 50 | 30 | 0 | 1200 | 15500 | 1.5 | $3.54 \times 10^6$ |
| *191 | 1.0 | 20 | 50 | 30 | 20 | 0 | 50 | 30 | 0 | 1250 | Not coherently sintered on firing | | |
| *192 | 0.5 | 20 | 50 | 30 | 20 | 0 | 50 | 30 | 0 | 1180 | 18800 | 10.5 | $2.12 \times 10^4$ |
| 193 | 0.5 | 20 | 50 | 30 | 20 | 0 | 50 | 30 | 0 | 1180 | 18200 | 2.1 | $2.97 \times 10^6$ |
| 194 | 0.5 | 20 | 50 | 30 | 20 | 0 | 50 | 30 | 0 | 1180 | 17500 | 1.8 | $2.99 \times 10^6$ |
| 195 | 0.5 | 20 | 50 | 30 | 20 | 0 | 50 | 30 | 0 | 1200 | 16800 | 1.4 | $3.25 \times 10^6$ |
| *196 | 0.5 | 20 | 50 | 30 | 20 | 0 | 50 | 30 | 0 | 1250 | Not coherently sintered on firing | | |

*marks show compared samples

In ① to ⑥ of Table 6, the column 1–w–x shows the ratio of atoms of Ba in the composition formula of the basic component, column w shows that of Ca, x shows that of Mg, 1–y–z shows that of Ti, and y shows that of Zr.

Column z shows the ratio of atoms of R in the composition formula of the basic component, and k shows that of $\{(Ba_{1-w-x}Ca_wMg_x)O\}$. Sc, Y, Gd, Dy, Ho, Er and Yb of column z are the contents of R in the composition formula of the basic component, and each column of the elements shows the ratio of atoms thereof. The column of the total shows the ratio of total numerals of atoms (value z).

In ① to ⑥ of Table 7, the added amount of the additional component is represented by parts by weight portions of the 100 parts by weight of the basic component. The contents of the column MO represent the ratio between BaO, SrO, MgO and ZnO in mol %.

The experiments with Samples Nos. 101 to 119 show the proper range of the additional component, the experiments with Samples Nos. 120 to 131 show the proper range of the added amount of the glass, and the experiments with Samples Nos. 132 to 143 show the proper range of the value w representing the ratio of atoms of Ca. The experiments with Samples Nos. 144 to 155 show the proper range of the value x representing that of Mg, the experiments with Samples No. 156 to 165 show the proper range of the value y representing that of Zr, and the experiments with Samples Nos. 166 to 174 show the influence of R. The experiments with Samples Nos. 175 to 186 show the proper range of the value z representing the ratio of atoms of R, and the experiments with Samples Nos. 187 to 196 show the proper range of the value k representing that of $\{(Ba_{1-w-x}Ca_wMg_x)O\}$.

It is clear from ① to ⑥ of Table 6 and ① to ⑥ of Table 7, in the samples according to the present invention, that by firing the samples in a non-oxidative atmosphere at a temperature of up to 1200° C., a ceramic capacitor having desired electric characteristics can be obtained. These capacitors have a dielectric constant $\epsilon_s$ of at least 7000, a dielectric loss (tan δ) of up to 2.5%, and a resistivity ρ of at least $1\times10^6$ MΩ·cm.

On the other hand, a ceramic capacitor having desired electric characteristics cannot be obtained as in Samples Nos. 111 to 113, 120, 125, 126, 131, 137, 143, 149, 155, 156, 160, 161, 165, 175, 180, 181, 186, 187, 191, 192 and 196 because these Samples are out of the composition range of the present invention.

Next, the proper composition range of the dielectric ceramic material according to the invention will be described in conjunction with the results of the experiments shown in (1) to (6) of Table 6 and ① to ⑥ of Table 7.

First, the proper range of w representing the ratio of atoms of Ca in the composition formula of the basic component will be described.

A dielectric sintered ceramic composition having desired electric characteristics can be obtained if w is 0.27 as shown in Samples Nos. 136 and 142. However, if w is 0.30 as shown in Samples Nos. 137 and 143, the firing temperature may be as high as 1250° C., and the dielectric constant $\epsilon_s$ is less than 7000. Accordingly, the upper limit of w is 0.27.

Ca is added in order to produce flat temperature characteristics and to improve the resistivity ρ. However, a dielectric ceramic material having desired electric characteristics can be obtained even if w is 0. Accordingly, the lower limit of w is 0.

The proper range of x representing the ratio of atoms of Mg in the composition formula of the basic component will be described.

A dielectric ceramic composition having desired electric characteristics can be obtained if x is 0.03 as shown in Samples Nos. 148 and 154. However, if x is 0.04 as shown in Samples Nos. 149 and 155, a dielectric constant $\epsilon_s$ drops rapidly to less than 7000. Accordingly, the upper limit of x is 0.03.

Mg can shift the Curie point to a lower temperature, producing flat temperature characteristics and improving the resistivity ρ. There is observed a significant effect if x is smaller than 0.03, even in the vicinity of 0, but it is desirable that x is 0.001 or more because the electric characteristics cannot be different in the case of mass-production.

The proper range of y representing the ratio of atoms of Zr in the composition formula of the basic component will be described.

A dielectric ceramic composition having desired electric characteristics can be obtained if y is 0.05 as shown in Samples Nos. 157 and 162. However, if y is 0.03 as shown in Samples Nos. 156 and 161, a dielectric constant $\epsilon_s$ is less than 7000. Accordingly, the lowest limit of y is 0.05.

On the other hand, a dielectric ceramic composition having desired electric characteristics can be obtained if y is 0.26 as shown in Samples Nos. 159 and 164. However, if y is 0.29 as shown in Samples Nos. 160 and 165, a dielectric constant $\epsilon_s$ is less than 7000. Accordingly, the upper limit of y is 0.26.

The proper range of z representing the ratio of atoms of R in the composition formula in the basic component is described.

A dielectric ceramic composition having desired electric characteristics can be obtained if z is 0.002 as shown in Samples Nos. 176 and 182. However, if z is 0.001 as shown in Samples Nos. 175 and 181, the dielectric loss (tan δ) quickly gets worse and the resistivity ρ is less than $1\times10^4$ MΩ·cm. Accordingly, the lowest limit of z is 0.002.

On the other hand, a dielectric ceramic composition having desired electric characteristics can be obtained if z is 0.04 as shown in Samples Nos. 179 and 185. However, if z is 0.06 as shown in Samples Nos. 180 and 186, a dense sintered material cannot be obtained, even if the firing temperature is 1250° C. Accordingly, the upper limit of z is 0.04.

Sc, Y, Dy, Ho, Er, and Yb of the R component perform almost the same function, so that any one or more of these elements can be used. Tb, Tm, and Lu of the R component are not mentioned in ① to ⑥ in Table 6. However, they have the same effect as other elements in the R component.

The proper range of k representing the ratio of {$(Ba_{1-w-x}Ca_wMg_x)O$} in the composition formula of the basic component will be described.

A dielectric ceramic composition having desired electric characteristics can be obtained if k is 1.00 as shown in Samples Nos. 188 and 193. However, if k is 0.99 as shown in Samples Nos. 187 and 192, the resistivity p becomes less than $1\times10^6$ MΩ·cm, and tan δ becomes worse. Accordingly, the lowest limit of k is 1.00.

On the other hand, a dielectric ceramic composition having desired electric characteristics can be obtained if k is 1.04 as shown in Samples Nos. 190 and 195. However, a dense sintered material cannot be obtained if k is 1.05 as shown in Samples Nos. 191 and 196. Accordingly, the upper limit of k is 1.04.

Next, the proper range of the amount of the additional component will be described.

A dielectric ceramic composition having desired electric characteristics can be obtained if the amount of the additional component added is 0.2 parts by weight in 100 parts by weight of the basic component and by firing at a temperature in the range of 1190° C. to 1200° C. as shown in Samples Nos. 121 and 127. However, a dense sintered material cannot be obtained if the amount of the additional component is 0, even if the firing temperature is 1250° C. as shown in Samples Nos. 120 and 126. Therefore, the lower limit of the amount of the additional component is 0.2 parts by weight in 100 parts by weight of the basic component.

A dielectric ceramic composition having desired electric characteristics can be obtained if the amount of the additional component added is 5 parts by weight in 100 parts by weight of the basic component as shown in Samples Nos. 124 and 130. However, the dielectric constant $\epsilon_s$ becomes less than 7000 if the amount of the additional component is 7 parts by weight in 100 parts by weight of the basic component as shown in Samples Nos. 125 and 131. Therefore, the upper limit of the amount of the additional component is 5 parts by weight in 100 parts by weight of the basic component.

Next, the desired composition ratio of the additional component will be described.

Figure 3:
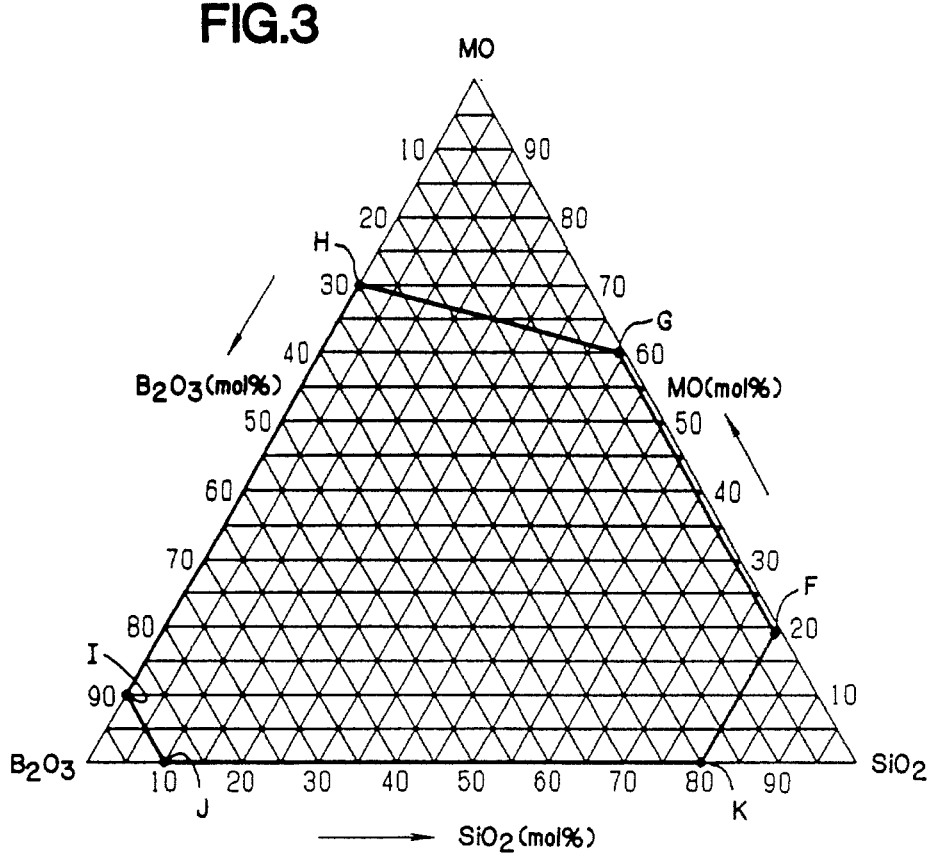
FIG. 3 is a ternary-system diagram showing the composition ratio of the additional component according to the second and fifth preferred embodiments herein.

The desired composition ratio in the additional component can be determined by the ternary system diagram in FIG. 3, showing the ratio of the components of $B_2O_3$—$SiO_2$—MO.

In FIG. 2 of the ternary system diagram, the first vertex F represents the composition of Sample No. 1 in which $B_2O_3$ is 1 mol %, $SiO_2$ is 80 mol %, and MO is 19 mol %. The second vertex G represents the composition of Sample No. 2 in which $B_2O_3$ is 1 mol %, $SiO_2$ is 39 mol %, and MO is 60 mol %. The third vertex H represents the composition of Sample No. 3 in which $B_2O_3$ is 30 mol %, $SiO_2$ is 0 mol %, and MO is 70 mol %. The fourth vertex I represents the composition of Sample No. 4 in which $B_2O_3$ is 90 mol %, $SiO_2$ is 0 mol %, and MO is 10 mol %. The fifth vertex J represents the composition of Sample No. 5 in which $B_2O_3$ is 90 mol %, $SiO_2$ is 10 mol %, and MO is 0 mol %. The sixth vertex K represents the composition of Sample No. 6 in which $B_2O_3$ is 20 mol %, $SiO_2$ is 80 mol %, and MO is 0 mol %.

The composition ratio of the additional component is desired to be within the area proscribed by a polygonal line connecting the first to sixth vertexes of F to K in the ternary system diagram of FIG. 3. A dielectric ceramic composition having desired electric characteristics can be obtained if the composition ratio of the additional component is within the area described above. However, a dense sintered material cannot be obtained if the composition ratio is outside of the range area of as shown in Samples No. 111 to 113.

The MO component may be any one of the metal oxides selected from the group consisting of BaO, SrO, CaO, MgO and ZnO as used in Sample Nos. 114 to 118. Also, more than one or more of these metal oxides may be blended in a proper ratio as in the samples of the present invention.

EXAMPLE 3

The third and sixth preferred embodiments are described hereinafter.

First, Sample No. 201 in Table 9-① and Table 10-① is described.

In this example, the laminated chip is made in the same way as in Example 1, except for the compounds of the additional component, which are shown in Table 8 below.

TABLE 8

| compounds | weight (g) | mol portion |
|---|---|---|
| $B_2O_3$ | 1.53 | 1.0 |
| $SiO_2$ | 66.20 | 50.0 |
| $Li_2O$ | 32.26 | 49.0 |

On the basis of their weight (g), the mol % of the compounds in Table 8 are calculated so that the $B_2O_3$ is 1 mol %, $SiO_2$ is 50 mol %, and $Li_2O$ is 49 mol %.

The laminated chip obtained in this example is placed in a furnace and heated, the temperature being increased by 100° C./h to 600° C. in air to oxidize and volatilize the organic binder of the non-sintered ceramic sheet.

Then, the atmosphere of the furnace is changed from air to a reductive atmosphere of $H_2$ (2 volume %)+$N_2$ (98 volume %). The temperature is then increased by 100° C./h from 600° C. to 1130° C., while maintaining the reductive atmosphere, and the highest temperature of 1130° C. is maintained for 3 hours. The temperature is then reduced by 100° C./h to 600° C., and the reductive atmosphere is changed to air (an oxidative atmosphere), and the temperature of 600° C. is maintained for 30 minutes to oxidize the laminated chip. Finally, the temperature is lowered to room temperature, and a laminated fired chip is obtained.

The external electrodes are fabricated on the laminated fired chip in the same way as in Example 1, and the measurements of electric characteristics are carried out in the same way as in Example 1. The results of the measurements, (Table 10-①), show a dielectric constant $\epsilon_s$ of 15200, tan δ of 1.4%, and a resistivity ρ of $3.28 \times 10^6$ MΩ·cm.

The method for making the Sample No. 201 and the characteristics thereof have been described above. As for Samples Nos. 202 to 292, laminated ceramic capacitors are fabricated by the same method and the electric characteristics are measured in the same way as for Sample No. 201, except that the compositions of the basic component are varied as shown in ① to ⑥ of Table 9, and the composition of the additional component and the temperature of firing is varied as shown in ① to ⑤ of Table 10. The temperature of firing and electric characteristics of Samples Nos. 201 to 292 are shown in ① to ⑤ of Table 10.

TABLE 9

| | Basic Component | | | | | | | | | | | | | |
|---|---|---|---|---|---|---|---|---|---|---|---|---|---|---|
| | Ba | Ca | Mg | Ti | Zr | | | | z | | | | | |
| Sample No. | 1 − w − x | w | x | 1 − y − z | y | Sc | Y | Gd | Dy | Ho | Er | Yb | total | K |
| 201 | 0.925 | 0.07 | 0.005 | 0.830 | 0.15 | 0.000 | 0.000 | 0.000 | 0.000 | 0.000 | 0.020 | 0.000 | 0.020 | 1.01 |
| 202 | 0.925 | 0.07 | 0.005 | 0.830 | 0.15 | 0.000 | 0.000 | 0.000 | 0.000 | 0.000 | 0.020 | 0.000 | 0.020 | 1.01 |
| 203 | 0.925 | 0.07 | 0.005 | 0.830 | 0.15 | 0.000 | 0.000 | 0.000 | 0.000 | 0.000 | 0.020 | 0.000 | 0.020 | 1.01 |
| 204 | 0.925 | 0.07 | 0.005 | 0.830 | 0.15 | 0.000 | 0.000 | 0.000 | 0.000 | 0.000 | 0.020 | 0.000 | 0.020 | 1.01 |
| 205 | 0.925 | 0.07 | 0.005 | 0.830 | 0.15 | 0.000 | 0.000 | 0.000 | 0.000 | 0.000 | 0.020 | 0.000 | 0.020 | 1.01 |
| 206 | 0.925 | 0.07 | 0.005 | 0.830 | 0.15 | 0.000 | 0.000 | 0.000 | 0.000 | 0.000 | 0.020 | 0.000 | 0.020 | 1.01 |
| 207 | 0.925 | 0.07 | 0.005 | 0.830 | 0.15 | 0.000 | 0.000 | 0.000 | 0.000 | 0.000 | 0.020 | 0.000 | 0.020 | 1.01 |
| 208 | 0.925 | 0.07 | 0.005 | 0.830 | 0.15 | 0.000 | 0.000 | 0.000 | 0.000 | 0.000 | 0.020 | 0.000 | 0.020 | 1.01 |
| 209 | 0.925 | 0.07 | 0.005 | 0.830 | 0.15 | 0.000 | 0.000 | 0.000 | 0.000 | 0.000 | 0.020 | 0.000 | 0.020 | 1.01 |
| 210 | 0.925 | 0.07 | 0.005 | 0.830 | 0.15 | 0.000 | 0.000 | 0.000 | 0.000 | 0.000 | 0.020 | 0.000 | 0.020 | 1.01 |
| 211 | 0.926 | 0.07 | 0.005 | 0.830 | 0.15 | 0.000 | 0.000 | 0.000 | 0.000 | 0.000 | 0.020 | 0.000 | 0.020 | 1.01 |
| *212 | 0.925 | 0.07 | 0.005 | 0.830 | 0.15 | 0.000 | 0.000 | 0.000 | 0.000 | 0.000 | 0.020 | 0.000 | 0.020 | 1.01 |
| *213 | 0.925 | 0.07 | 0.005 | 0.830 | 0.15 | 0.000 | 0.000 | 0.000 | 0.000 | 0.000 | 0.020 | 0.000 | 0.020 | 1.01 |
| *214 | 0.925 | 0.07 | 0.005 | 0.830 | 0.15 | 0.000 | 0.000 | 0.000 | 0.000 | 0.000 | 0.020 | 0.000 | 0.020 | 1.01 |
| *215 | 0.925 | 0.07 | 0.005 | 0.830 | 0.15 | 0.000 | 0.000 | 0.000 | 0.000 | 0.000 | 0.020 | 0.000 | 0.020 | 1.01 |
| *216 | 0.925 | 0.07 | 0.005 | 0.830 | 0.15 | 0.000 | 0.000 | 0.000 | 0.000 | 0.000 | 0.020 | 0.000 | 0.020 | 1.01 |
| 217 | 0.925 | 0.07 | 0.005 | 0.830 | 0.15 | 0.000 | 0.000 | 0.000 | 0.000 | 0.000 | 0.020 | 0.000 | 0.020 | 1.01 |
| 218 | 0.925 | 0.07 | 0.005 | 0.830 | 0.15 | 0.000 | 0.000 | 0.000 | 0.000 | 0.000 | 0.020 | 0.000 | 0.020 | 1.01 |
| 219 | 0.925 | 0.07 | 0.005 | 0.830 | 0.15 | 0.000 | 0.000 | 0.000 | 0.000 | 0.000 | 0.020 | 0.000 | 0.020 | 1.01 |
| 220 | 0.925 | 0.07 | 0.005 | 0.830 | 0.15 | 0.000 | 0.000 | 0.000 | 0.000 | 0.000 | 0.020 | 0.000 | 0.020 | 1.01 |
| *221 | 0.925 | 0.07 | 0.005 | 0.830 | 0.15 | 0.000 | 0.000 | 0.000 | 0.000 | 0.000 | 0.020 | 0.000 | 0.020 | 1.01 |

TABLE 9-continued

| | Basic Component | | | | | | | | | | | | | |
|---|---|---|---|---|---|---|---|---|---|---|---|---|---|---|
| | Ba | Ca | Mg | Ti | Zr | | | | z | | | | | |
| Sample No. | $1-w-x$ | w | x | $1-y-z$ | y | Sc | Y | Gd | Dy | Ho | Er | Yb | total | K |
| *222 | 0.795 | 0.20 | 0.005 | 0.810 | 0.18 | 0.000 | 0.010 | 0.000 | 0.000 | 0.000 | 0.000 | 0.000 | 0.010 | 1.03 |
| 223 | 0.795 | 0.20 | 0.005 | 0.810 | 0.18 | 0.000 | 0.010 | 0.000 | 0.000 | 0.000 | 0.000 | 0.000 | 0.010 | 1.03 |
| 224 | 0.795 | 0.20 | 0.005 | 0.810 | 0.18 | 0.000 | 0.010 | 0.000 | 0.000 | 0.000 | 0.000 | 0.000 | 0.010 | 1.03 |
| 225 | 0.795 | 0.20 | 0.005 | 0.810 | 0.18 | 0.000 | 0.010 | 0.000 | 0.000 | 0.000 | 0.000 | 0.000 | 0.010 | 1.03 |
| 226 | 0.795 | 0.20 | 0.005 | 0.810 | 0.18 | 0.000 | 0.010 | 0.000 | 0.000 | 0.000 | 0.000 | 0.000 | 0.010 | 1.03 |
| *227 | 0.795 | 0.20 | 0.005 | 0.810 | 0.18 | 0.000 | 0.010 | 0.000 | 0.000 | 0.000 | 0.000 | 0.000 | 0.010 | 1.03 |
| 228 | 0.990 | 0.00 | 0.010 | 0.850 | 0.13 | 0.000 | 0.000 | 0.000 | 0.000 | 0.020 | 0.000 | 0.000 | 0.020 | 1.02 |
| 229 | 0.970 | 0.02 | 0.010 | 0.850 | 0.13 | 0.000 | 0.000 | 0.000 | 0.000 | 0.020 | 0.000 | 0.000 | 0.020 | 1.02 |
| 230 | 0.890 | 0.10 | 0.010 | 0.850 | 0.13 | 0.000 | 0.000 | 0.000 | 0.000 | 0.020 | 0.000 | 0.000 | 0.020 | 1.02 |
| 231 | 0.790 | 0.20 | 0.010 | 0.850 | 0.13 | 0.000 | 0.000 | 0.000 | 0.000 | 0.020 | 0.000 | 0.000 | 0.020 | 1.02 |
| 232 | 0.720 | 0.27 | 0.010 | 0.850 | 0.13 | 0.000 | 0.000 | 0.000 | 0.000 | 0.020 | 0.000 | 0.000 | 0.020 | 1.02 |
| *233 | 0.690 | 0.30 | 0.010 | 0.850 | 0.13 | 0.000 | 0.000 | 0.000 | 0.000 | 0.020 | 0.000 | 0.000 | 0.020 | 1.02 |
| 234 | 0.995 | 0.00 | 0.005 | 0.790 | 0.20 | 0.000 | 0.000 | 0.000 | 0.010 | 0.000 | 0.000 | 0.000 | 0.010 | 1.00 |
| 235 | 0.975 | 0.02 | 0.005 | 0.790 | 0.20 | 0.000 | 0.000 | 0.000 | 0.010 | 0.000 | 0.000 | 0.000 | 0.010 | 1.00 |
| 236 | 0.895 | 0.10 | 0.005 | 0.790 | 0.20 | 0.000 | 0.000 | 0.000 | 0.010 | 0.000 | 0.000 | 0.000 | 0.010 | 1.00 |
| 237 | 0.795 | 0.20 | 0.005 | 0.790 | 0.20 | 0.000 | 0.000 | 0.000 | 0.010 | 0.000 | 0.000 | 0.000 | 0.010 | 1.00 |
| 238 | 0.725 | 0.27 | 0.005 | 0.790 | 0.20 | 0.000 | 0.000 | 0.000 | 0.010 | 0.000 | 0.000 | 0.000 | 0.010 | 1.00 |
| *239 | 0.695 | 0.30 | 0.005 | 0.790 | 0.20 | 0.000 | 0.000 | 0.000 | 0.010 | 0.000 | 0.000 | 0.000 | 0.010 | 1.00 |
| 240 | 0.949 | 0.05 | 0.001 | 0.870 | 0.10 | 0.000 | 0.000 | 0.000 | 0.000 | 0.030 | 0.000 | 0.000 | 0.030 | 1.01 |
| 241 | 0.945 | 0.05 | 0.005 | 0.870 | 0.10 | 0.000 | 0.000 | 0.000 | 0.000 | 0.030 | 0.000 | 0.000 | 0.030 | 1.01 |
| 242 | 0.940 | 0.05 | 0.010 | 0.870 | 0.10 | 0.000 | 0.000 | 0.000 | 0.000 | 0.030 | 0.000 | 0.000 | 0.030 | 1.01 |
| 243 | 0.930 | 0.05 | 0.020 | 0.870 | 0.10 | 0.000 | 0.000 | 0.000 | 0.000 | 0.030 | 0.000 | 0.000 | 0.030 | 1.01 |
| 244 | 0.920 | 0.05 | 0.030 | 0.870 | 0.10 | 0.000 | 0.000 | 0.000 | 0.000 | 0.030 | 0.000 | 0.000 | 0.030 | 1.01 |
| *245 | 0.910 | 0.05 | 0.040 | 0.870 | 0.10 | 0.000 | 0.000 | 0.000 | 0.000 | 0.030 | 0.000 | 0.000 | 0.030 | 1.01 |
| 246 | 0.869 | 0.13 | 0.001 | 0.815 | 0.18 | 0.000 | 0.000 | 0.000 | 0.000 | 0.000 | 0.000 | 0.005 | 0.005 | 1.01 |
| 247 | 0.865 | 0.13 | 0.005 | 0.815 | 0.18 | 0.000 | 0.000 | 0.000 | 0.000 | 0.000 | 0.000 | 0.005 | 0.005 | 1.01 |
| 248 | 0.860 | 0.13 | 0.010 | 0.815 | 0.18 | 0.000 | 0.000 | 0.000 | 0.000 | 0.000 | 0.000 | 0.005 | 0.005 | 1.01 |
| 249 | 0.850 | 0.13 | 0.020 | 0.815 | 0.18 | 0.000 | 0.000 | 0.000 | 0.000 | 0.000 | 0.000 | 0.005 | 0.005 | 1.01 |
| 250 | 0.840 | 0.13 | 0.030 | 0.815 | 0.18 | 0.000 | 0.000 | 0.000 | 0.100 | 0.000 | 0.000 | 0.005 | 0.005 | 1.01 |
| *251 | 0.830 | 0.13 | 0.040 | 0.815 | 0.18 | 0.000 | 0.000 | 0.000 | 0.000 | 0.000 | 0.000 | 0.005 | 0.005 | 1.01 |
| *252 | 0.940 | 0.05 | 0.010 | 0.950 | 0.03 | 0.000 | 0.000 | 0.020 | 0.000 | 0.000 | 0.000 | 0.000 | 0.020 | 1.01 |
| 253 | 0.940 | 0.05 | 0.010 | 0.930 | 0.05 | 0.000 | 0.000 | 0.020 | 0.000 | 0.000 | 0.000 | 0.000 | 0.020 | 1.01 |
| 254 | 0.940 | 0.05 | 0.010 | 0.830 | 0.15 | 0.000 | 0.000 | 0.020 | 0.000 | 0.000 | 0.000 | 0.000 | 0.020 | 1.01 |
| 255 | 0.940 | 0.05 | 0.010 | 0.720 | 0.26 | 0.000 | 0.000 | 0.020 | 0.000 | 0.000 | 0.000 | 0.000 | 0.020 | 1.01 |
| *256 | 0.940 | 0.05 | 0.010 | 0.690 | 0.29 | 0.000 | 0.000 | 0.020 | 0.000 | 0.000 | 0.000 | 0.000 | 0.020 | 1.01 |
| *257 | 0.845 | 0.15 | 0.005 | 0.930 | 0.03 | 0.000 | 0.040 | 0.000 | 0.000 | 0.000 | 0.000 | 0.000 | 0.040 | 1.03 |
| 258 | 0.845 | 0.15 | 0.005 | 0.910 | 0.05 | 0.000 | 0.040 | 0.000 | 0.000 | 0.000 | 0.000 | 0.000 | 0.040 | 1.03 |
| 259 | 0.845 | 0.15 | 0.005 | 0.810 | 0.15 | 0.000 | 0.040 | 0.000 | 0.000 | 0.000 | 0.000 | 0.000 | 0.040 | 1.03 |
| 260 | 0.845 | 0.15 | 0.005 | 0.700 | 0.26 | 0.000 | 0.040 | 0.000 | 0.000 | 0.000 | 0.000 | 0.000 | 0.040 | 1.03 |
| *261 | 0.845 | 0.15 | 0.005 | 0.670 | 0.29 | 0.000 | 0.040 | 0.000 | 0.000 | 0.000 | 0.000 | 0.000 | 0.040 | 1.03 |
| 262 | 0.920 | 0.07 | 0.010 | 0.870 | 0.12 | 0.010 | 0.000 | 0.000 | 0.000 | 0.000 | 0.000 | 0.000 | 0.010 | 1.02 |
| 263 | 0.920 | 0.07 | 0.010 | 0.870 | 0.12 | 0.000 | 0.010 | 0.000 | 0.000 | 0.000 | 0.000 | 0.000 | 0.010 | 1.02 |
| 264 | 0.920 | 0 07 | 0.010 | 0.870 | 0.12 | 0.000 | 0.000 | 0.010 | 0.000 | 0.000 | 0.000 | 0.000 | 0.010 | 1.02 |
| 265 | 0.920 | 0.07 | 0.010 | 0.870 | 0.12 | 0.000 | 0.000 | 0.000 | 0.010 | 0.000 | 0.000 | 0.000 | 0.010 | 1.02 |
| 266 | 0.920 | 0.07 | 0.010 | 0.870 | 0.12 | 0.000 | 0.000 | 0.000 | 0.000 | 0.010 | 0.000 | 0.000 | 0.010 | 1.02 |
| 267 | 0.920 | 0.07 | 0.010 | 0.870 | 0.12 | 0.000 | 0.000 | 0.000 | 0.000 | 0.000 | 0.010 | 0.000 | 0.010 | 1.02 |
| 268 | 0.920 | 0.07 | 0.010 | 0.870 | 0.12 | 0.000 | 0.000 | 0.000 | 0.000 | 0.000 | 0.000 | 0.010 | 0.010 | 1.02 |
| 269 | 0.920 | 0.07 | 0.010 | 0.870 | 0.12 | 0.000 | 0.005 | 0.000 | 0.005 | 0.000 | 0.000 | 0.000 | 0.010 | 1.02 |
| 270 | 0.920 | 0.07 | 0.010 | 0.870 | 0.12 | 0.000 | 0.000 | 0.002 | 0.000 | 0.004 | 0.000 | 0.004 | 0.010 | 1.02 |
| *271 | 0.848 | 0.15 | 0.002 | 0.929 | 0.07 | 0.000 | 0.000 | 0.000 | 0.000 | 0.000 | 0.000 | 0.001 | 0.001 | 1.01 |
| 272 | 0.848 | 0.15 | 0.002 | 0.928 | 0.07 | 0.000 | 0.000 | 0.000 | 0.000 | 0.000 | 0.000 | 0.002 | 0.002 | 1.01 |
| 273 | 0.848 | 0.15 | 0.002 | 0.925 | 0.07 | 0.000 | 0.000 | 0.000 | 0.000 | 0.000 | 0.000 | 0.005 | 0.005 | 1.01 |
| 274 | 0.848 | 0.15 | 0.002 | 0.910 | 0.07 | 0.000 | 0.000 | 0.000 | 0.000 | 0.000 | 0.000 | 0.020 | 0.020 | 1.01 |
| 275 | 0.848 | 0.15 | 0.002 | 0.890 | 0.07 | 0.000 | 0.000 | 0.000 | 0.000 | 0.000 | 0.000 | 0.040 | 0.040 | 1.01 |
| *276 | 0.848 | 0.15 | 0.002 | 0.870 | 0.07 | 0.000 | 0.000 | 0.000 | 0.000 | 0.000 | 0.000 | 0.060 | 0.060 | 1.01 |
| *277 | 0.950 | 0.03 | 0.020 | 0.869 | 0.13 | 0.000 | 0.000 | 0.000 | 0.001 | 0.000 | 0.000 | 0.000 | 0.001 | 1.02 |
| 278 | 0.950 | 0.03 | 0.020 | 0.868 | 0.13 | 0.000 | 0.000 | 0.000 | 0.002 | 0.000 | 0.000 | 0.000 | 0.002 | 1.02 |
| 279 | 0.950 | 0.03 | 0.020 | 0.865 | 0.13 | 0.000 | 0.000 | 0.000 | 0.005 | 0.000 | 0.000 | 0.000 | 0.005 | 1.02 |
| 280 | 0.950 | 0.03 | 0.020 | 0.850 | 0.13 | 0.000 | 0.000 | 0.000 | 0.020 | 0.000 | 0.000 | 0.000 | 0.020 | 1.02 |
| 281 | 0.950 | 0.03 | 0.020 | 0.830 | 0.13 | 0.000 | 0.000 | 0.000 | 0.040 | 0.000 | 0.000 | 0.000 | 0.040 | 1.02 |
| *282 | 0.950 | 0.03 | 0.020 | 0.810 | 0.13 | 0.000 | 0.000 | 0.000 | 0.060 | 0.000 | 0.000 | 0.000 | 0.060 | 1.02 |
| *283 | 0.940 | 0.05 | 0.010 | 0.810 | 0.18 | 0.000 | 0.010 | 0.000 | 0.000 | 0.000 | 0.000 | 0.000 | 0.010 | 0.99 |
| 284 | 0.940 | 0.05 | 0.010 | 0.810 | 0.18 | 0.000 | 0.010 | 0.000 | 0.000 | 0.000 | 0.000 | 0.000 | 0.010 | 1.00 |
| 285 | 0.940 | 0.05 | 0.010 | 0.810 | 0.18 | 0.000 | 0.010 | 0.000 | 0.000 | 0.000 | 0.000 | 0.000 | 0.010 | 1.02 |
| 286 | 0.940 | 0.05 | 0.010 | 0.810 | 0.18 | 0.000 | 0.010 | 0.000 | 0.000 | 0.000 | 0.000 | 0.000 | 0.010 | 1.04 |
| *287 | 0.940 | 0.05 | 0.010 | 0.810 | 0.18 | 0.000 | 0.010 | 0.000 | 0.000 | 0.000 | 0.000 | 0.000 | 0.010 | 1.05 |
| *288 | 0.895 | 0.10 | 0.005 | 0.795 | 0.20 | 0.000 | 0.000 | 0.000 | 0.000 | 0.005 | 0.000 | 0.000 | 0.005 | 0.99 |
| 289 | 0.895 | 0.10 | 0.005 | 0.795 | 0.20 | 0.000 | 0.000 | 0.000 | 0.000 | 0.005 | 0.000 | 0.000 | 0.005 | 1.00 |
| 290 | 0.895 | 0.10 | 0.005 | 0.795 | 0.20 | 0.000 | 0.000 | 0.000 | 0.000 | 0.005 | 0.000 | 0.000 | 0.005 | 1.02 |
| 291 | 0.895 | 0.10 | 0.005 | 0.795 | 0.20 | 0.000 | 0.000 | 0.000 | 0.000 | 0.005 | 0.000 | 0.000 | 0.005 | 1.04 |
| *292 | 0.895 | 0.10 | 0.005 | 0.795 | 0.20 | 0.000 | 0.000 | 0.000 | 0.000 | 0.005 | 0.000 | 0.000 | 0.005 | 1.05 |

*marks show compared samples

TABLE 10

| | Additional Component | | | | Characteristics | | |
|---|---|---|---|---|---|---|---|
| | Amount weight | Composition (mol %) | | Temp. of firing | Dielectric constant | tan δ | Resistivity ρ |
| Sample No. | portions | $B_2O_3$ | $SiO_2$ | $Li_2O$ | (°C.) | ε | (%) | (MΩ · cm) |
| 201 | 2.0 | 1 | 50 | 49 | 1130 | 15200 | 1.4 | $3.28 \times 10^6$ |
| 202 | 2.0 | 50 | 1 | 49 | 1130 | 15300 | 1.4 | $3.04 \times 10^6$ |
| 203 | 2.0 | 80 | 1 | 19 | 1130 | 15600 | 1.4 | $2.99 \times 10^6$ |
| 204 | 2.0 | 89 | 10 | 1 | 1130 | 15200 | 1.4 | $3.61 \times 10^6$ |
| 205 | 2.0 | 19 | 80 | 1 | 1160 | 15700 | 1.5 | $3.46 \times 10^6$ |
| 206 | 2.0 | 1 | 80 | 19 | 1160 | 15100 | 1.4 | $3.56 \times 10^6$ |
| 207 | 2.0 | 25 | 40 | 35 | 1130 | 15500 | 1.5 | $3.42 \times 10^6$ |
| 208 | 2.0 | 60 | 10 | 30 | 1130 | 15600 | 1.4 | $3.66 \times 10^6$ |
| 209 | 2.0 | 65 | 25 | 10 | 1130 | 15700 | 1.5 | $2.91 \times 10^6$ |
| 210 | 2.0 | 15 | 70 | 15 | 1130 | 15900 | 1.4 | $3.14 \times 10^6$ |
| 211 | 2.0 | 40 | 35 | 25 | 1130 | 15700 | 1.6 | $3.17 \times 10^6$ |
| *212 | 2.0 | 10 | 35 | 55 | 1250 | Not coherently sintered on firing | | |
| *213 | 2.0 | 35 | 5 | 60 | 1250 | Not coherently sintered on firing | | |
| *214 | 2.0 | 90 | 5 | 5 | 1250 | Not coherently sintered on firing | | |
| *215 | 2.0 | 5 | 90 | 5 | 1250 | Not coherently sintered on firing | | |
| *216 | 0.0 | 0 | 0 | 0 | 1250 | Not coherently sintered on firing | | |
| 217 | 0.2 | 35 | 55 | 10 | 1190 | 19200 | 2.3 | $3.01 \times 10^6$ |
| 218 | 1.0 | 35 | 55 | 10 | 1170 | 17900 | 1.8 | $2.55 \times 10^6$ |
| 219 | 3.0 | 35 | 55 | 10 | 1130 | 13800 | 1.2 | $3.26 \times 10^6$ |
| 220 | 5.0 | 35 | 55 | 10 | 1080 | 9400 | 0.8 | $5.66 \times 10^6$ |
| *221 | 7.0 | 35 | 55 | 10 | 1060 | 5200 | 0.8 | $1.05 \times 10^7$ |
| *222 | 0.0 | 0 | 0 | 0 | 1250 | Not coherently sintered on firing | | |
| 223 | 0.2 | 5 | 65 | 30 | 1200 | 10300 | 1.1 | $4.86 \times 10^6$ |
| 224 | 1.0 | 5 | 65 | 30 | 1170 | 9200 | 0.9 | $5.35 \times 10^6$ |
| 225 | 3.0 | 5 | 65 | 30 | 1140 | 8100 | 0.8 | $6.93 \times 10^6$ |
| 226 | 5.0 | 5 | 65 | 30 | 1100 | 7200 | 0.7 | $6.72 \times 10^6$ |
| *227 | 7.0 | 5 | 65 | 30 | 1060 | 5200 | 0.6 | $8.84 \times 10^6$ |
| 228 | 2.0 | 54 | 45 | 1 | 1150 | 16000 | 1.6 | $2.94 \times 10^6$ |
| 229 | 2.0 | 54 | 45 | 1 | 1170 | 15500 | 1.5 | $3.70 \times 10^6$ |
| 230 | 2.0 | 54 | 45 | 1 | 1170 | 12200 | 1.2 | $4.64 \times 10^6$ |
| 231 | 2.0 | 54 | 45 | 1 | 1180 | 10500 | 1.0 | $4.65 \times 10^6$ |
| 232 | 2.0 | 54 | 45 | 1 | 1180 | 7300 | 0.7 | $6.95 \times 10^6$ |
| *233 | 2.0 | 54 | 45 | 1 | 1250 | 5500 | 0.5 | $1.05 \times 10^7$ |
| 234 | 3.0 | 30 | 25 | 45 | 1120 | 12700 | 1.3 | $3.99 \times 10^6$ |
| 235 | 3.0 | 30 | 25 | 45 | 1150 | 12300 | 1.1 | $4.48 \times 10^6$ |
| 236 | 3.0 | 30 | 25 | 45 | 1150 | 10500 | 0.9 | $5.15 \times 10^6$ |
| 237 | 3.0 | 30 | 25 | 45 | 1180 | 8800 | 0.7 | $6.03 \times 10^6$ |
| 238 | 3.0 | 30 | 25 | 45 | 1180 | 7300 | 0.7 | $6.22 \times 10^6$ |
| *239 | 3.0 | 30 | 25 | 45 | 1250 | 5200 | 0.6 | $1.04 \times 10^7$ |
| 240 | 0.5 | 25 | 40 | 35 | 1150 | 15500 | 1.5 | $3.53 \times 10^6$ |
| 241 | 0.5 | 25 | 40 | 35 | 1150 | 16200 | 1.6 | $3.17 \times 10^6$ |
| 242 | 0.5 | 25 | 40 | 35 | 1150 | 14700 | 1.5 | $3.24 \times 10^6$ |
| 243 | 0.5 | 25 | 40 | 35 | 1180 | 12600 | 1.4 | $4.26 \times 10^6$ |
| 244 | 0.5 | 25 | 40 | 35 | 1180 | 10800 | 1.1 | $5.05 \times 10^6$ |
| *245 | 0.5 | 25 | 40 | 35 | 1120 | 3600 | 1.2 | $1.45 \times 10^7$ |
| 246 | 1.0 | 40 | 35 | 25 | 1150 | 13400 | 1.1 | $3.86 \times 10^6$ |
| 247 | 1.0 | 40 | 35 | 25 | 1150 | 13600 | 1.3 | $4.16 \times 10^6$ |
| 248 | 1.0 | 40 | 35 | 25 | 1150 | 11200 | 1.2 | $4.43 \times 10^6$ |
| 249 | 1.0 | 40 | 35 | 25 | 1180 | 9700 | 0.9 | $5.40 \times 10^6$ |
| 250 | 1.0 | 40 | 35 | 25 | 1180 | 7700 | 0.9 | $6.32 \times 10^6$ |
| *251 | 1.0 | 40 | 35 | 25 | 1120 | 3500 | 1.2 | $1.53 \times 10^7$ |
| *252 | 1.0 | 65 | 25 | 10 | 1160 | 5700 | 2.0 | $8.68 \times 10^6$ |
| 253 | 1.0 | 65 | 25 | 10 | 1160 | 9800 | 1.7 | $5.01 \times 10^6$ |
| 254 | 1.0 | 65 | 25 | 10 | 1160 | 18200 | 1.6 | $2.93 \times 10^6$ |
| 255 | 1.0 | 65 | 25 | 10 | 1160 | 12200 | 1.0 | $3.77 \times 10^6$ |
| *256 | 1.0 | 65 | 25 | 10 | 1160 | 6200 | 0.6 | $7.69 \times 10^6$ |
| *257 | 3.0 | 40 | 35 | 25 | 1140 | 5400 | 1.6 | $1.04 \times 10^7$ |
| 258 | 3.0 | 40 | 35 | 25 | 1140 | 8500 | 2.0 | $6.81 \times 10^6$ |
| 259 | 3.0 | 40 | 35 | 25 | 1140 | 12900 | 1.6 | $3.96 \times 10^6$ |
| 260 | 3.0 | 40 | 35 | 25 | 1140 | 8400 | 0.7 | $6.96 \times 10^6$ |
| *261 | 3.0 | 40 | 35 | 25 | 1140 | 5200 | 0.4 | $9.26 \times 10^6$ |
| 262 | 0.5 | 15 | 70 | 15 | 1160 | 13700 | 1.3 | $4.21 \times 10^6$ |
| 263 | 0.5 | 15 | 70 | 15 | 1160 | 14000 | 1.3 | $3.70 \times 10^6$ |
| 264 | 0.5 | 15 | 70 | 15 | 1160 | 13400 | 1.2 | $4.04 \times 10^6$ |
| 265 | 0.5 | 15 | 70 | 15 | 1160 | 14100 | 1.3 | $3.36 \times 10^6$ |
| 266 | 0.5 | 15 | 70 | 15 | 1160 | 13500 | 1.2 | $3.61 \times 10^6$ |
| 267 | 0.5 | 15 | 70 | 15 | 1160 | 14300 | 1.3 | $4.01 \times 10^6$ |
| 268 | 0.5 | 15 | 70 | 15 | 1160 | 13400 | 1.1 | $4.36 \times 10^6$ |
| 269 | 0.5 | 15 | 70 | 15 | 1160 | 13900 | 1.3 | $4.19 \times 10^6$ |
| 270 | 0.5 | 15 | 70 | 15 | 1160 | 13300 | 1.0 | $4.32 \times 10^6$ |
| *271 | 2.0 | 65 | 25 | 10 | 1130 | 5800 | 11.5 | $4.76 \times 10^2$ |
| 272 | 2.0 | 65 | 25 | 10 | 1130 | 7300 | 1.4 | $6.84 \times 10^6$ |

TABLE 10-continued

| | Additional Component | | | | Characteristics | | |
|---|---|---|---|---|---|---|---|
| | Amount weight | Composition (mol %) | | | Temp. of firing | Dielectric constant | tan δ | Resistivity ρ |
| Sample No. | portions | $B_2O_3$ | $SiO_2$ | $Li_2O$ | (°C.) | $\epsilon$ | (%) | (MΩ · cm) |
| 273 | 2.0 | 65 | 25 | 10 | 1130 | 7800 | 1.2 | $6.43 \times 10^6$ |
| 274 | 2.0 | 65 | 25 | 10 | 1130 | 11400 | 1.4 | $4.40 \times 10^6$ |
| 275 | 2.0 | 65 | 25 | 10 | 1180 | 14700 | 2.0 | $3.70 \times 10^6$ |
| *276 | 2.0 | 65 | 25 | 10 | 1250 | Not coherently sintered on firing | | |
| *277 | 4.0 | 5 | 65 | 30 | 1130 | 8600 | 9.5 | $7.82 \times 10^7$ |
| 278 | 4.0 | 5 | 65 | 30 | 1130 | 9800 | 1.4 | $4.89 \times 10^6$ |
| 279 | 4.0 | 5 | 65 | 30 | 1130 | 10500 | 1.1 | $4.29 \times 10^6$ |
| 280 | 4.0 | 5 | 65 | 30 | 1180 | 12000 | 1.1 | $4.07 \times 10^6$ |
| 281 | 4.0 | 5 | 65 | 30 | 1180 | 8700 | 0.9 | $5.43 \times 10^6$ |
| *282 | 4.0 | 5 | 65 | 30 | 1250 | Not coherently sintered on firing | | |
| *283 | 1.0 | 30 | 25 | 45 | 1150 | 18800 | 6.9 | $2.88 \times 10^4$ |
| 284 | 1.0 | 30 | 25 | 45 | 1150 | 17500 | 1.6 | $3.09 \times 10^6$ |
| 285 | 1.0 | 30 | 25 | 45 | 1150 | 16900 | 1.5 | $3.45 \times 10^6$ |
| 286 | 1.0 | 30 | 25 | 45 | 1180 | 16000 | 1.5 | $3.24 \times 10^6$ |
| *287 | 1.0 | 30 | 25 | 45 | 1250 | No coherently sintered on firing | | |
| *288 | 0.5 | 30 | 25 | 45 | 1180 | 18600 | 10.4 | $8.68 \times 10^3$ |
| 289 | 0.5 | 30 | 25 | 45 | 1180 | 18300 | 2.1 | $2.78 \times 10^6$ |
| 290 | 0.5 | 30 | 25 | 45 | 1180 | 17600 | 1.7 | $3.15 \times 10^6$ |
| 291 | 0.5 | 30 | 25 | 45 | 1120 | 16800 | 1.4 | $3.23 \times 10^6$ |
| *292 | 0.5 | 30 | 25 | 45 | 1250 | Not coherently sintered on firing | | |

*marks show compared samples

In ① to ⑥ of Table 9, the column 1–w–x shows the ratio of atoms of Ba in the composition formula of the basic component, the column w shows that of Ca, x shows that of Mg, 1–y–z shows that of Ti, and y shows that of Zr.

The column z shows the ratio of atoms of R in the composition formula of the basic component, and k shows that of $\{(Ba_{1-w-x}Ca_wMg_x)O\}$. Sc, Y, Gd, Dy, Ho, Er and Yb of the column z are the contents of R in the composition formula of the basic component, and each column of the elements shows the ratio of atoms thereof, and the column of the total shows the ratio of total numbers of atoms (value z).

In ① to ⑤ of Table 10, the amount of the additional component is represented by parts by weight in the 100 parts by weight of the basic component.

The experiments with Samples Nos. 201 to 215 shows the proper range of the glasis in the additional component, the experiments with Samples Nos. 216 to 227 shows the proper range of the added amount of the glass, the experiments with Samples Nos. 228 to 239 shows the proper range of the value w representing the ratio of atoms of Ca, and the experiments with Samples Nos. 240 to 251 shows the proper range of the value x representing that of Mg. The experiments with Samples Nos. 252 to 261 shows the proper range of the value y representing that of Zr. The experiments with Samples Nos. 262 to 270 shows the influence of the contents of R, the experiments with Samples Nos. 271 to 282 shows the proper range of the value z representing the ratio of atoms of R. The experiments with Samples Nos. 283 to 292 shows the proper range of the value k representing that of $\{(Ba_{1-w-x}Ca_w-Mg_x)O\}$.

It is clear by ① to ⑥ of Table 9 and ① to ⑤ of Table 10 that, in the samples according to the invention, by firing the samples in a non-oxidative atmosphere at a temperature up to 1200° C., the ceramic capacitor having desired electric characteristics can be obtained, in which a dielectric constant $\epsilon_s$ of at least 7000, a dielectric loss (tan δ) of up to 2.5%, and a resistivity ρ of at least $1 \times 10^6$ MΩ·cm.

On the other hand, the ceramic capacitor having desired electric characteristics cannot be obtained by the Samples Nos. 212 to 216, 221, 222, 227, 233, 239, 245, 251, 252, 256, 257, 261, 271, 276, 277, 282, 283, 287, 288 and 292. Accordingly, the Samples mentioned above are out of the range of the invention.

Next, the proper composition range of the dielectric ceramic material according to the present invention will be described in conjunction with the results of the experiments shown in ① to ⑥ of Table 9 and ① to ⑤ of Table 10.

First, the proper range of the value w representing the ratio of atoms of Ca in the composition formula of the basic component will be described.

A dielectric sintered ceramic composition having desired electric characteristics can be obtained if the value w is 0.27 as shown in Samples Nos. 232 and 238. However, if the value w is 0.30, as shown in Samples Nos. 233 and 239, the firing temperature may be as high as 1250° C., and the dielectric constant $\epsilon_s$ becomes less than 7000. Accordingly, the upper limit of w is 0.27.

Ca is added in order to produce flat temperature characteristics and to improve the resistivity ρ. However, a dielectric ceramic material having desired electric characteristics can be obtained even if w is 0. Accordingly, the lower limit of w is 0.

The proper range of x representing the ratio of atoms of Mg in the composition formula of the basic component will be described.

A dielectric ceramic composition having desired electric characteristics can be obtained if x is 0.03 as shown in Samples Nos. 244 and 250. However, if x is 0.04 as shown in Samples Nos. 245 and 251, a dielectric constant $\epsilon_s$ drops rapidly to less than 7000. Accordingly, the upper limit of x is 0.03.

Mg can shift the Curie point to lower temperatures, producing flat temperature characteristics and improved resistivity ρ. There is observed a significant effect if x is smaller than 0.03, even in the vicinity of 0, but it is desirable that x is 0.001 or more because the electric characteristics cannot be different in the case of mass-production.

The proper range of y representing the ratio of atoms of Zr in the composition formula of the basic component will be described.

A dielectric ceramic composition having desired electric characteristics can be obtained if y is 0.05 as shown in Samples Nos. 253 and 258. However, if y is 0.03 as shown in Samples Nos. 252 and 257, the dielectric constant $\epsilon_s$ is less than 7000. Accordingly, the lowest limit of y is 0.05.

On the other hand, a dielectric ceramic composition having desired electric characteristics can be obtained if y is 0.26 as shown in Samples Nos. 255 and 260. However, if y is 0.29 as shown in Samples Nos. 256 and 261, the dielectric constant $\epsilon_s$ is less than 7000. Accordingly, the upper limit of y is 0.26.

The proper range of z representing the ratio of atoms of R in the composition formula in the basic component is described.

A dielectric ceramic composition having desired electric characteristics can be obtained if z is 0.002 as shown in Samples Nos. 272 and 278. However, if z is 0.001 as shown in Samples Nos. 271 and 277, the dielectric loss (tan δ) quickly gets worse and the resistivity ρ is less than $1\times10^4$ MΩ·cm. Accordingly, the lowest limit of z is 0.002.

On the other hand, a dielectric ceramic composition having desired electric characteristics can be obtained if z is 0.04 as shown in Samples Nos. 275 and 281. However, if z is 0.06 as shown in Samples No. 276 and 282, a dense sintered material cannot be obtained, even if the firing temperature is 1250° C. Accordingly, the upper limit of z is 0.04.

Sc, Y, Dy, Ho, Er and Yb of the R component perform almost the same function, so that any one or more than one can be used. Tb, Tm and Lu of the R component are not mentioned in ① to ⑥ in Table 9. However, they have the same effect as other elements in the R component.

The proper range of k representing the ratio of {($Ba_{1-w-x}Ca_wMg_x$)O} in the composition formula of the basic component will be described.

A dielectric ceramic composition having desired electric characteristics can be obtained if k is 1.00 as shown in Samples Nos. 284 and 289. However, if k is 0.99 as shown in Samples Nos. 283 and 288, the resistivity ρ becomes less than $1\times10^6$ MΩ·cm and tan δ becomes worse. Accordingly, the lowest limit of k is 1.00.

On the other hand, a dielectric ceramic composition having desired electric characteristics can be obtained if k is 1.04 as shown in Samples Nos. 286 and 291. However, a dense sintered material cannot be obtained if k is 1.05 as shown in Samples Nos. 287 and 292. Accordingly, the upper limit of k is 1.04.

Next, the proper range of the amount of the additional component will be described.

A dielectric ceramic composition having desired electric characteristics can be obtained if the amount of the additional component is 0.2 parts by weight in 100 parts by weight of the basic component and firing occurs at a temperature in the range of 1190° C. to 1200° C. as shown in Samples Nos. 217 and 223. However, a dense sintered material cannot be obtained if the amount of the additional component is 0, even if the firing temperature is 1250° C. as shown in Samples Nos. 216 and 222. Therefore, the lower limit of the amount of the additional component is 0.2 parts by weight in 100 parts by weight of the basic component.

A dielectric ceramic composition having desired electric characteristics can be obtained if the amount of the additional component added is 5 parts by weight in 100 parts by weight of the basic component as shown in Samples Nos. 220 and 226. However, the dielectric constant $\epsilon_s$ becomes less than 7000 if the amount of the additional component is 7 parts by weight in 100 parts by weight of the basic component as shown in Samples Nos. 221 and 227. Therefore, the upper limit of the amount of the additional component is 5 parts by weight in 100 parts by weight of the basic component.

Next, the desired composition ratio of the additional component will be described.

Figure 4:
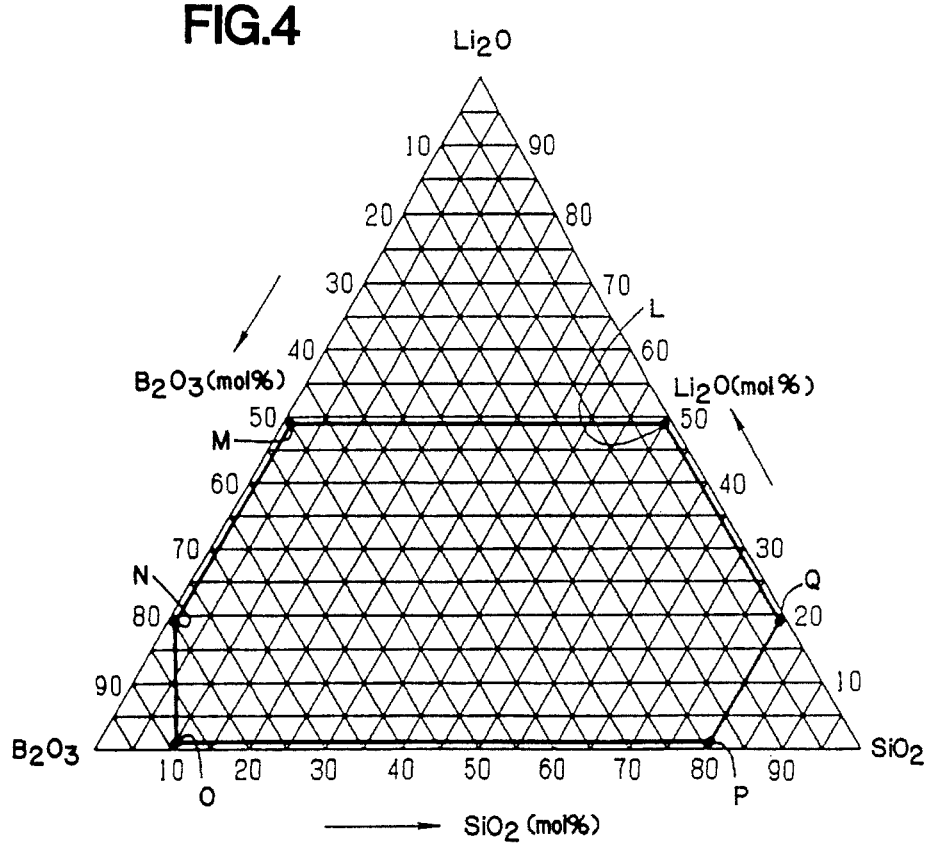
FIG. 4 is a ternary-system diagram showing the composition ratio of the additional component according to the third and sixth preferred embodiments herein.

The desired composition ratio in the additional component can be determined from the ternary system diagram in FIG. 4, showing the ratio of the components of $B_2O_3$—$SiO_2$—$Li_2O$.

In FIG. 4 of the ternary system diagram, the first vertex L represents the composition of the Sample No. 1 in which $B_2O_3$ is 1 mol %, $SiO_2$ is 50 mol % and $Li_2O$ is 49 mol %, the second vertex M represents the composition of the Sample No. 2 in which $B_2O_3$ is 50 mol %, $SiO_2$ is 1 mol % and $Li_2O$ is 49 mol %, and the third vertex N represents the composition of the Sample No. 3 in which $B_2O_3$ is 80 mol %, $SiO_2$ is 1 mol % and $Li_2O$ is 19 mol %. The fourth vertex O represents the composition of the Sample No. 4 in which $B_2O_3$ is 89 mol %, $SiO_2$ is 10 mol % and $Li_2O$ is 1 mol %, and the fifth vertex P represents the composition of the Sample No. 5 in which $B_2O_3$ is 19 mol %, $SiO_2$ is 80 mol % and $Li_2O$ is 1 mol %. The sixth vertex Q represents the composition of the Sample No. 6 in which $B_2O_3$ is 1 mol %, $SiO_2$ is 80 mol % and $Li_2O$ is 19 mol %.

The ratio of constituents in the additional component is preferably within the area proscribed by a polygonal line connecting the first to sixth vertexes of L to Q of the ternary system diagram of FIG. 4. A dielectric ceramic composition having desired electric characteristics can be obtained if the composition ratio of the additional component is within the area described above; however, a dense sintered material cannot be obtained if the composition ratio is outside of the area as shown in Samples Nos. 212 to 215.

What is claimed is:

1. A ceramic capacitor, comprising:

at least one dielectric ceramic layer consisting essentially of a dielectric ceramic composition and at least two internal electrodes sandwiching said dielectric ceramic composition;

said dielectric ceramic composition consisting essentially of a fired mixture of a basic component of 100 parts by weight and an additional component in the range of 0.2 to 5 parts by weight;

said basic component consisting essentially of a material represented by the following formula:

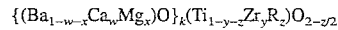

$$\{(Ba_{1-w-x}Ca_wMg_x)O\}_k(Ti_{1-y-z}Zr_yR_z)O_{2-z/2}$$

where, R is one or more elements selected from the group consisting of Sc, Y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $Li_2O$, $SiO_2$ and MO wherein said MO is at least one oxide selected from the group consisting of BaO, SrO, CaO, MgO and ZnO; and a ratio among amounts of $Li_2O$, $SiO_2$ and MO in said additional component is within an area in a ternary system of mol % having five vertexes of first to fifth vertexes wherein:

said first vertex A represents a condition in which amounts of $Li_2O$ is 1 mol %, $SiO_2$ is 80 mol % and MO is 19 mol %;

said second vertex B represents a condition in which amounts of $Li_2O$ is 1 mol %, $SiO_2$ is 39 mol % and MO is 60 mol %;

said third vertex C represents a condition in which amounts of $Li_2O$ is 30 mol %, $SiO_2$ is 30 mol % and MO is 40 mol %;

said fourth vertex D represents a condition in which amounts of $Li_2O$ is 50 mol %, $SiO_2$ is 50 mol % and MO is 0 mol %; and said fifth vertex E represents a condition in which amounts of $Li_2O$ is 20 mol %, $SiO_2$ is 80 mol % and MO is 0 mol %.

2. A ceramic capacitor, comprising:

at least one dielectric ceramic layer consisting essentially of a dielectric ceramic composition and at least two internal electrodes sandwiching said dielectric ceramic composition;

said dielectric ceramic composition consisting essentially of a fired mixture of a basic component of 100 parts by weight and an additional component in the range of 0.2 to 5 parts by weight;

said basic component consisting essentially of a material represented by the following formula:

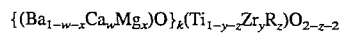

where, R is one or more elements selected from the group consisting of Sc, Y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $B_2O_3$, $SiO_2$ and MO wherein said MO is at least one oxide selected from the group consisting of BaO, SrO, CaO, MgO and ZnO; and a ratio among amounts of $B_2O_3$, $SiO_2$ and MO in said additional component is within an area in a ternary system diagram of mol % having six vertexes of first to sixth vertexes, wherein:

said first vertex F represents a condition in which amounts of $B_2O_3$ is 1 mol %, $SiO_2$ is 80 mol % and MO is 19 mol %;

said second vertex G represents a condition in which amounts of $B_2O_3$ is 1 mol %, $SiO_2$ is 39 mol % and MO is 60 mol %;

said third vertex H represents a condition in which amounts of $B_2O_3$ is 30 mol %, $SiO_2$ is 0 mol % and MO is 70 mol %;

said fourth vertex I represents a condition in which amounts of $B_2O_3$ is 90 mol %, $SiO_2$ is 0 mol % and MO is 10 mol %;

said fifth vertex J represents a condition in which amounts of $B_2O_3$ is 90 mol %, $SiO_2$ is 10 mol % and MO is 0 mol %; and said sixth vertex K represents a condition in which amounts of $B_2O_3$ is 20 mol %, $SiO_2$ is 80 mol % and MO is 0 mol %.

3. A ceramic capacitor, comprising:

at lease one dielectric ceramic layer consisting essentially of a dielectric ceramic composition and at least two internal electrodes sandwiching said dielectric ceramic composition;

said dielectric ceramic composition consisting essentially of a fired mixture of a basic component of 100 parts by weight and an additional component in the range of 0.2 to 5 parts by weight;

said basic component consisting essentially of a material represented by the following formula:

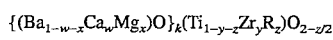

where, R is one or more elements selected from the group consisting of Sc, Y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $B_2O_3$, $SiO_2$ and $Li_2O$; and a ratio among amounts of $B_2O_3$, $SiO_2$ and $Li_2O$ in said additional component is within an area in a ternary system diagram of mol % having six vertexes of first to sixth vertexes wherein:

said first vertex L represents a condition in which amounts of $B_2O_3$ is 1 mol %, $SiO_2$ is 50 mol % and $Li_2O$ is 49 mol %;

said second vertex M represents a condition in which amounts of $B_2O_3$ is 50 mol %, $SiO_2$ is 1 mol % and $Li_2O$ is 49 mol %;

said third vertex N represents a condition in which amounts of $B_2O_3$ is 80 mol %, $SiO_2$ is 1 mol % and $Li_2O$ is 19 mol %;

said fourth vertex O represents a condition in which amounts of $B_2O_3$ is 89 mol %, $SiO_2$ is 10 mol % and $Li_2O$ is 1 mol %;

said fifth vertex P represents a condition in which amounts of $B_2O_3$ is 19 mol %, $SiO_2$ is 80 mol % and $Li_2O$ is 1 mol %; and said sixth vertex Q represents a condition in which amounts of $B_2O_3$ is 1 mol %, $SiO_2$ is 80 mol % and $Li_2O$ is 19 mol %.

4. A method for fabricating a ceramic capacitor, comprising the steps of:

providing a mixture of non-sintered ceramic powder;

forming a non-sintered ceramic sheet consisting of said mixture;

fabricating a laminated structure in which said non-sintered ceramic sheet is sandwiched between at least two conductive paste layers;

firing said laminated structure under a non-oxidative atmosphere; and heating said fired laminated structure under an oxidative atmosphere;

said mixture of non-sintered ceramic powder consisting essentially of a fired mixture of a basic component of 100 parts by weight and an additional component in the range of 0.2 to 5 parts by weight;

said basic component consisting essentially of a material represented by the following formula:

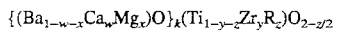

where, R is one or more elements selected from the group consisting of Sc, Y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $Li_2O$, $SiO_2$ and MO wherein said MO is at least one oxide selected from the group consisting of BaO, SrO, CaO, MgO and ZnO; and a ratio among amounts of $Li_2O$, $SiO_2$ and MO in said additional component is within an area in a ternary system diagram of mol % having five vertexes of first to fifth vertexes, wherein:

said first vertex A represents a condition in which amounts of $Li_2O$ is 1 mol %, $SiO_2$ is 80 mol % and MO is 19 mol %;

said second vertex B represents a condition in which amounts of $Li_2O$ is 1 mol %, $SiO_2$ is 39 mol % and MO is 60 mol %;

said third vertex C represents a condition in which amounts of $Li_2O$ is 30 mol %, $SiO_2$ is 30 mol % and MO is 40 mol %;

said fourth vertex D represents a condition in which amounts of $Li_2O$ is 50 mol %, $SiO_2$ is 50 mol % and MO is 0 mol %; and said fifth vertex E represents a condition in which amounts of $Li_2O$ is 20 mol %, $SiO_2$ is 80 mol % and MO is 0 mol %.

5. A method for fabricating a ceramic capacitor, comprising the steps of:

providing a mixture of non-sintered ceramic powder;

forming a non-sintered ceramic sheet consisting of said mixture;

fabricating a laminated structure in which said non-sintered ceramic sheet is sandwiched between at least two conductive paste layers;

firing said laminated structure under a non-oxidative atmosphere; and heating said fired laminated structure under an oxidative atmosphere;

said mixture of non-sintered ceramic powder consisting essentially of a fired mixture of a basic component of 100 parts by weight and an additional component in the range of 0.2 to 5 parts by weight;

said basic component consisting essentially of a material represented by the following formula:

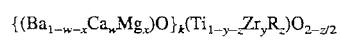

where, R is one or more metal elements selected from the group consisting of Sc, Y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $B_2O_3$, $SiO_2$ and MO wherein said MO is at least one oxide selected from the group consisting of BaO, SrO, CaO, MgO and ZnO; and a ratio among amounts of $B_2O_3$, $SiO_2$ and MO in said additional component is within an area in a ternary system diagram of mol % having six vertexes of first to sixth vertexes wherein:

said first vertex F represents a condition in which amounts of $B_2O_3$ is 1 mol %, $SiO_2$ is 80 mol % and MO is 19 mol %;

said second vertex G represents a condition in which amounts of $B_2O_3$ is 1 mol %, $SiO_2$ is 39 mol % and MO is 60 mol %;

said third vertex H represents a condition in which amounts of $B_2O_3$ is 30 mol %, $SiO_2$ is 0 mol % and $Li_2O$ is 70 mol %;

said fourth vertex I represents a condition in which amounts of $B_2O_3$ is 90 mol %, $SiO_2$ is 0 mol % and MO is 10 mol %;

said fifth vertex J represents a condition in which amounts of $B_2O_3$ is 90 mol %, $SiO_2$ is 10 mol % and MO is 0 mol %; and said sixth vertex K represents a condition in which amounts of $B_2O_3$ is 20 mol %, $SiO_2$ is 80 mol % and MO is 0 mol %.

6. A method for fabricating a ceramic capacitor, comprising the steps of:

providing a mixture of non-sintered ceramic powder;

forming a non-sintered ceramic sheet consisting of said mixture;

fabricating a laminated structure in which said non-sintered ceramic sheet is sandwiched between at least two conductive paste layers;

firing said laminated structure under a non-oxidative atmosphere; and heating said fired laminated structure under an oxidative atmosphere;

said mixture of non-sintered ceramic powder consisting essentially of a fired mixture of a basic component of 100 parts by weight and an additional component in the range of 0.2 to 5 parts by weight;

said basic component consisting essentially of a material represented by the following formula:

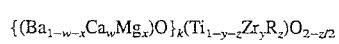

where, R is one or more metal elements selected from the group consisting of Sc, i y, Gd, Dy, Ho, Er, Yb, Tb, Tm and Lu; and w, x, y, z and k are numerals fulfilling the following conditions:

$0.00 \leq w \leq 0.27$
$0.001 \leq x \leq 0.03$
$0.05 \leq y \leq 0.26$
$0.002 \leq z \leq 0.04$
$1.00 \leq k \leq 1.04$ said additional component consisting essentially of $B_2O_3$, $SiO_2$ and $Li_2O$; and a ratio among amounts of $B_2O_3$, $SiO_2$ and $Li_2O$ in said additional component is within an area in a ternary system diagram of mol % having six vertexes of first to sixth vertexes wherein:

said first vertex L represents a condition in which amounts of $B_2O_3$ is 1 mol %, $SiO_2$ is 50 mol % and $Li_2O$ is 49 mol %;

said second vertex M represents a condition in which amounts of $B_2O_3$ is 50 mol %, $SiO_2$ is 1 mol % and $Li_2O$ is 49 mol %;

said third vertex N represents a condition in which amounts of $B_2O_3$ is 80 mol %, $SiO_2$ is 1 mol % and $Li_2O$ is 19 mol %;

said fourth vertex O represents a condition in which amounts of $B_2O_3$ is 89 mol %, $SiO_2$ is 10 mol % and $Li_2O$ is 1 mol %;

said fifth vertex P represents a condition in which amounts of $B_2O_3$ is 19 mol %, $SiO_2$ is 80 mol % and $Li_2O$ is 1 mol %; and said sixth vertex Q represents a condition in which amounts of $B_2O_3$ is 1 mol %, $SiO_2$ is 80 mol % and $Li_2O$ is 19 mol %.

\* \* \* \* \*